US008332612B1

(12) United States Patent
Raizen et al.

(10) Patent No.: US 8,332,612 B1
(45) Date of Patent: *Dec. 11, 2012

(54) SYSTEMS AND METHODS FOR USING THIN PROVISIONING TO RECLAIM SPACE IDENTIFIED BY DATA REDUCTION PROCESSES

(75) Inventors: Helen S. Raizen, Jamaica Plan, MA (US); Michael E. Bappe, Loveland, CO (US); Agarkov Vadim Nikolaevich, Saint Petersburg (RU); William Carl Biester, Danville, CA (US); Richard Ruef, Livermore, CA (US); Karl M. Owen, Chapel Hill, NC (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/411,936

(22) Filed: Mar. 5, 2012

Related U.S. Application Data

(63) Continuation of application No. 12/642,109, filed on Dec. 18, 2009, now Pat. No. 8,156,306.

(51) Int. Cl.
*G06F 12/08* (2006.01)

(52) U.S. Cl. ........................................ 711/202; 707/813

(58) Field of Classification Search ........................ None
See application file for complete search history.

(56) References Cited

U.S. PATENT DOCUMENTS

| | | | |
|---|---|---|---|
| 6,810,398 B2 | 10/2004 | Moulton | |
| 7,065,619 B1 | 6/2006 | Zhu et al. | |
| 7,143,251 B1 | 11/2006 | Patterson | |
| 7,272,602 B2 | 9/2007 | Moulton | |
| 7,305,532 B2 | 12/2007 | Zhu et al. | |
| 7,424,498 B1 | 9/2008 | Patterson | |
| 7,451,168 B1 | 11/2008 | Patterson | |
| 7,472,242 B1 | 12/2008 | Deshmukh et al. | |
| 7,500,246 B2 | 3/2009 | Saake et al. | |
| 7,519,635 B1 | 4/2009 | Haustein et al. | |
| 7,526,623 B1 | 4/2009 | Rao | |
| 7,539,710 B1 | 5/2009 | Haustein et al. | |
| 7,562,186 B2 | 7/2009 | Li et al. | |
| 7,567,188 B1 | 7/2009 | Anglin et al. | |
| 7,594,085 B1 | 9/2009 | Rao | |

(Continued)

OTHER PUBLICATIONS

Press Release, EMC Expands Data Deduplication Capabilities to Industry's Broadest Backup Portfolio, http://www.emc.com/about/news/press/2009/20090519-01.htm, dated Oct. 19, 2009, 3 pages.

(Continued)

*Primary Examiner* — Gary Portka
(74) *Attorney, Agent, or Firm* — Daly, Crowley, Mofford & Durkee, LLP

(57) ABSTRACT

The invention provides a system to reclaim space identified as no longer in use and comprises a vLUN, a thinly provisioned mapped LUN, a mapping layer, and a data reduction engine. Chunks of data are stored at logical chunk addresses (LCAs) in the vLUN and are mapped to corresponding physical chunk addresses (PCAs) in the thinly provisioned mapped LUN. The data reduction engine performs a data reduction process on a first logical chunk of data stored at a first LCA in the vLUN, where the first logical chunk has a size that is a nonzero integer multiple of the size of the storage extent of the thinly provisioned mapped LUN. After the data reduction process, the PCA associated with the first logical chunk is no longer needed, and the thinly provisioned mapped LUN is instructed to deallocate the PCA associated with the first logical chunk that is no longer needed.

20 Claims, 18 Drawing Sheets

U.S. PATENT DOCUMENTS

| | | | |
|---|---|---|---|
| 7,603,529 | B1 | 10/2009 | MacHardy et al. |
| 7,603,532 | B2 | 10/2009 | Rajan et al. |
| 7,747,584 | B1 | 6/2010 | Jernigan |
| 7,984,022 | B2 | 7/2011 | Cannon et al. |
| 2007/0061373 | A1 | 3/2007 | Kilday |
| 2007/0233707 | A1 | 10/2007 | Osmond et al. |
| 2008/0034268 | A1 | 2/2008 | Dodd et al. |
| 2008/0184001 | A1 | 7/2008 | Stager |
| 2008/0244172 | A1 | 10/2008 | Kano |
| 2008/0282047 | A1 | 11/2008 | Arakawa et al. |
| 2009/0049260 | A1 | 2/2009 | Upadhyayula |
| 2009/0063528 | A1 | 3/2009 | Yueh |
| 2009/0063795 | A1 | 3/2009 | Yueh |
| 2009/0119449 | A1 | 5/2009 | Chengal |
| 2009/0193223 | A1 | 7/2009 | Saliba et al. |
| 2009/0198805 | A1 | 8/2009 | Ben-Shaul et al. |
| 2009/0216774 | A1 | 8/2009 | Rao et al. |
| 2009/0216788 | A1 | 8/2009 | Rao et al. |
| 2009/0235022 | A1 | 9/2009 | Bates et al. |
| 2010/0250896 | A1 | 9/2010 | Matze |

OTHER PUBLICATIONS

Lauren Whitehouse, Data Backup Tips: Backup and Recovery, Data Deduplication Methods Block-level versus byte-level dedupe, http://searchdatabackup.techtarget.com/tip/0,289483,sid187_gci1335090,000.html, dated Oct. 19, 2009, 3 pages.

Joe Spurr, Data Center News: Deduping: an essential backup tool in the data center?, http://searchdatacenter.techtarget.com/news/article/0,289142,sid80_gci1192939,00.html, dated Oct. 19, 2009, 3 pages.

BitWacki™—Data Deduplication for Microsoft Windows Servers, Hardware-Assisted Data Deduplication and Compression with Thin Provisioning, Plug and Play Deduplication, HIFN, www.hifn.com, 2009, 2 pages.

Deduping Your Way to Storage Efficiency, Data Deduplication Cuts Down on Repeated Data, Processor, Cover Focus Articles, General Information Jan. 26, 2007, vol. 29, Issue 4, http://www.processsor.com/editorial/PrntArticle.asp?prnt=1&article=aricles%2FP2904%2F21p04%2F2, Oct. 24, 2009 4 pages.

IDC White Paper, Data Deduplication for Backup: Accelerating Efficiency and Driving Down IT Costs, Sponsored by EMC Corporation, Laura DuBois, May 2009, www.idc.com, 16 pages.

EMC White Paper, Optimized Backup and Recovery for Vmware Infrastructure with EMC Avamar, Vmware, Inc. www.vmware.com, Revision 2007, 11 pages.

EMC White Paper, Data Sheet, Emc CLARiion CX4: the Best Energy Efficiency in Midrange Storage, "EMC CLARiiON Virtual Provisioning", Applied Technology, Sep. 2009, www.emc.com, 23 pages.

EMC White Paper, EMC Perspective, An EMC Perspective on Data De-Duplication for Backup, www.emc.com, 2008, 11 pages.

EMC White Paper, Implementing Virtual Provisioning on EMC CLARiiON and Celerra with Vmware Infrastructure, Applied Technology, Feb. 2009, 49 pages.

EMC White Paper, Optimized Vmware Backup and Recovery with EMC Avamar and EMC CLARiiON Replication Technology, Applied Technology, Dec. 2008, 15 pages.

EMC White Paper, Data Sheet, Next-generation backup and recovery with global, source data deduplication, www.EMC.com, 2007, 2009, 4 pages.

EMC Avamar—Backup and Recovery Product—EMC, www.emc.com/products/detail/software/avamar.htm, Oct. 19, 2009, 3 pages.

EMC Avamar, ESG Lab Validation Report, Revolutionizing Backup and Recovery, by Brian Garrett, May 2008, 21 pages.

EMC White Paper, ESG, Disk Backup and EMC: Addressing Today's Business Problems by Heidi Biggar, May 2008, 9 pages.

EMC White Paper, Virtual Provisioning Options for EMC Unified Storage Platforms, A Detailed Review, Sep. 2009, 20 pages.

Dell/EMC CX4 Virtual Provisioning Overview, Dell Inc., www.Dell.com, Aug. 2008, 14 pages.

EMC White Paper, EMC Centera, Optimizing Archive Efficiency, by Terri McClure with Brian Garrett, Jan. 2009, 11 pages.

EMC White Paper, Implementing Virtual Provisioning on EMC Symmetrx DMX with Vmware Virtual Infrastructure, Vmware, Inc., www.vmware.com, 2008, 30 pages.

Helen S. Raizen, et al., U.S. Appl. No. 12/642,071, filed Dec. 18, 2009, 83 pages.

Office Action dated Oct. 11, 2011 for U.S. Appl. No. 12/642,071, filed Dec. 18, 2009, 10 pages.

Response to Office Action dated Oct. 11, 2011, for U.S. Appl. No. 12/642,071, filed Dec. 18, 2009, 10 pages.

Notice of Allowance dated Dec. 12, 2011, for U.S. Appl. No. 12/642,071, filed Dec. 18, 2009, 5 pages.

File downloaded for U.S. Appl. No. 12/642,109, filed Dec. 18, 2009, file through Mar. 5, 2012, 146 pages, Part 1.

File downloaded for U.S. Appl. No. 12/642,109, filed Dec. 18, 2009, file through Mar. 5, 2012, 146 pages, Part 2.

File downloaded for U.S. Appl. No. 12/642,109, filed Dec. 18, 2009, file through Mar. 5, 2012, 240 pages, Part 3.

U.S. App. No. 12/642,071; filed Dec. 18, 2009; 220 pages.

U.S. App. No. 12/346,109; filed Dec. 18, 2009; 5 pages.

SYSTEMS AND METHODS FOR USING THIN PROVISIONING TO RECLAIM SPACE IDENTIFIED BY DATA REDUCTION PROCESSES

CROSS REFERENCE TO RELATED APPLICATION

This application is a continuation of and claims priority to U.S. application Ser. No. 12/642,109 filed Dec. 18, 2009 which is incorporated herein by reference in its entirety.

FIELD OF THE INVENTION

Embodiments of the invention generally relate to devices, systems, and methods for data storage in computer systems. More particularly, the invention relates to systems and methods to use deduplication, compression and/or other data reduction techniques to improve the efficiency of data storage and to reclaim data storage freed by data reduction techniques.

BACKGROUND OF THE INVENTION

Enterprises as well as individuals are becoming increasingly dependent on computers. As more and more data are generated, the need for efficient and reliable data storage systems, as well as for increased amounts of available storage, is increasing. There are a variety of systems in existence today, utilizing both local and network storage for processes such as primary and backup data storage. For example, during a backup operation, the data from the data sources are copied to the backup devices. Commonly, there is a substantial amount of data from each of the data sources that remains the same between two consecutive backups, and sometimes there are several copies of the same data. Similarly, in primary storage systems, different applications, or users of the same application, might be storing the same file, such as an email message or an operating system related file. These and other types of systems can have more available space and be more efficient if unchanged data, or data for which a duplicate already exists, is not written, or rewritten, to the storage device.

Various approaches have been used to reduce the amount of information that is stored (referred to herein as "data reduction", "space saving", and/or "space reclamation"), including techniques such as data compression, file deduplication, block deduplication, and delta block optimization (also referred to as delta-based deduplication). Data compression techniques are essentially transparent to applications and storage hardware and use well-known algorithms to reduce the size of files by eliminating redundant bits. Compression is capable of providing, depending on data type, significant reductions in data, as is well understood in the art. There can still be multiple copies of a given file, however, even if all of the copies are compressed, because compression cannot detect or reduce multiple copies of the same file.

Delta block optimization reduces the amount of data backed up and stored from a source by attempting to determine which blocks are new and then writing only the blocks that are changed to backup. This technique does not, however, reduce multiple copies of the same file that can be written to storage by different users.

File-level deduplication removes multiple copies of the same file, where duplicate files are replaced with a pointer to the unique version of the file. Typically, file-level duplication is not effective at removing files that have minor changes compared with previous versions of the file.

Block deduplication (whether fixed or variable block size) eliminates redundant or duplicate data by retaining just one unique instance or copy of blocks or chunks of data. Redundant data is replaced with a pointer to the block of a unique data copy. The amount of aggregate data deduplication is at least partially dependent on data type. Block deduplication can become even more efficient as identical data is stored multiple times on the storage device.

A downside to both file and block-level deduplication methods is their effect on read and write performance, especially when used in connection with primary data storage; block-level deduplication has less of an effect on backup data storage, because backup data storage generally is not read as often as is primary data storage. For example, streams of bytes that have not been subject to space saving techniques like deduplication or data compression generally are stored sequentially in chunks, making it relatively efficient and straightforward to read or write to any given address anywhere within the stored stream of bytes. In contrast, with space saving techniques such as deduplication, the stream of bytes might not be in the same order, but may be stored in several different places such that a computer system may have to traverse several different locations before it actually can read data.

For example, with conventional deduplication methods (whether in-line or post process), during an application write to a deduplicated logical device, there is a need to find an unallocated space to write to; a need to update the map of the location where the data is stored; and possibly a need to update counts (e.g., the stored metadata pointers) on a shared block, any of which can add an appreciable latency (time) and overhead to the write process. Similarly, with conventional deduplication methods (whether in-line or post process), for an application read to a deduplicated logical device, one issue is that the location of the block(s) being read must be looked up in metadata. Also, for sequential reads, the data blocks that have been deduplicated likely are no longer stored in sequence; that is, the application read must restore a file from blocks that may be pointed to in potentially many different places, also adding appreciable latency and overhead, so as to reconstitute the file to the form expected by the application.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

In one embodiment, the invention provides a system to reclaim space identified as no longer in use, the system comprising:

a virtual logic unit (vLUN) layer that corresponds to one of a plurality of layers in an input/output (I/O) path of a computer system, the vLUN providing a plurality of logical chunk addresses (LCAs) to layers disposed above it in the I/O path, such that the LCAs in the vLUN are the only LCAs visible to layers above the vLUN;

a thinly provisioned mapped logical unit (mapped LUN) layer disposed below the vLUN in the I/O path and being in operable communication with the vLUN, the thinly provisioned mapped LUN being in operable communication a pool of storage units that provide, as requested, storage to the thinly provisioned mapped LUN, the thinly provisioned mapped LUN having associated therewith a storage extent of a predetermined size, the storage extent defining a minimum size of storage that the thinly provisioned mapped LUN can be directed to allocate or deallocate from the pool, wherein the mapped LUN is associated with a plurality of physical chunk addresses (PCAs), each PCA configured to provide physical storage for a respective chunk of data;

a mapping layer disposed between and in operable communication with the vLUN and the thinly provisioned mapped LUN layers, the mapping layer defining a layout of the thinly provisioned mapped LUN that facilitates efficient input/output (I/O) access to the mapped LUN, the layout comprising:

a first region comprising a set of first PCAs, each first PCA being allotted to provide physical storage for a respective first chunk of data stored at a single first corresponding LCA in the vLUN;

a second region comprising a set of second PCAs, each second PCA being allotted to provide physical storage for a respective second chunk of data, where the second chunk of data corresponds to data that is associated with at least two LCAs;

a metadata region, the metadata region including a first portion indicating, for each LCA in the vLUN, whether the corresponding PCA for is in the first region or the second region of the mapped LUN, and a second portion providing, if the corresponding PCA is in the second region of the mapped LUN, mapping information for the LCA to the corresponding PCA in the second region, wherein the first portion of the metadata is stored in the memory of the computer system to facilitate efficient I/O access to the chunks of data stored in the mapped LUN.

a data reduction engine in operable communication with the mapping layer, the data reduction configured to:

perform a data reduction process on a first logical chunk of data stored in the vLUN at a first LCA and associated with a first PCA, wherein the first logical chunk has a size that is a nonzero integer multiple of the size of the storage extent remap the first LCA to a second PCA in the second region, such that the first PCA in the first region is no longer required for storage of the first logical chunk of data and is therefore a first unneeded chunk; and instruct the thinly provisioned mapped LUN to deallocate the first dPCA associated with the first unneeded chunk.

The thinly-provisioned mapped LUN can be implemented as part of a storage appliance or computer system. The data reduction engine can comprise at least one of a deduplication engine and a compression engine.

In a further embodiment, the invention comprises a computer program product, comprising a computer-usable storage medium having a computer-readable program code stored therein, the computer-readable program code containing instructions that when executed by a processor of a computer system implement a method to reclaim space identified as no longer in use, the method comprising:

implementing a virtual logic unit (vLUN) layer that corresponds to one of a plurality of layers in an input/output (I/O) path of a computer system, the vLUN providing a plurality of logical chunk addresses (LCAs) to layers disposed above it in the I/O path, such that the LCAs in the vLUN are the only LCAs visible to layers above the vLUN;

providing a thinly provisioned mapped logical unit (mapped LUN) layer disposed below the vLUN in the I/O path and being in operable communication with the vLUN, the thinly provisioned mapped LUN being in operable communication a pool of storage units that provide, as requested, storage to the thinly provisioned mapped LUN, the thinly provisioned mapped LUN having associated therewith a storage extent of a predetermined size, the storage extent defining a minimum size of storage that the thinly provisioned mapped LUN can be directed to allocate or deallocate from the pool, wherein the mapped LUN is associated with a plurality of physical chunk addresses (PCAs), each PCA configured to provide physical storage for a respective chunk of data;

implementing a mapping layer disposed between and in operable communication with the vLUN and the thinly provisioned mapped LUN layers, the mapping layer defining a layout of the thinly provisioned mapped LUN that facilitates efficient input/output (I/O) access to the mapped LUN, the layout comprising:

a first region comprising a set of first PCAs, each first PCA being allotted to provide physical storage for a respective first chunk of data stored at a single first corresponding LCA in the vLUN;

a second region comprising a set of second PCAs, each second PCA being allotted to provide physical storage for a respective second chunk of data, where the second chunk of data corresponds to data that is associated with at least two LCAs;

a metadata region, the metadata region including a first portion indicating, for each LCA in the vLUN, whether the corresponding PCA for is in the first region or the second region of the mapped LUN, and a second portion providing, if the corresponding PCA is in the second region of the mapped LUN, mapping information for the LCA to the corresponding PCA in the second region, wherein the first portion of the metadata is stored in the memory of the computer system to facilitate efficient I/O access to the chunks of data stored in the mapped LUN;

performing a data reduction process on a first logical chunk of data stored in the vLUN at a first LCA and associated with a first PCA, wherein the first logical chunk has a size that is a nonzero integer multiple of the size of the storage extent remapping the first LCA to a second PCA in the second region, such that the first PCA in the first region is no longer required for storage of the first logical chunk of data and is therefore a first unneeded chunk; and instructing the thinly provisioned mapped LUN to deallocate the first dPCA associated with the first unneeded chunk.

Details relating to this and other embodiments of the invention are described more fully herein.

The subject matter claimed herein is not restricted to embodiments that solve any particular problems, that overcome any particular disadvantages, or that operate only in technological environments such as those described herein. Rather, the above background and summary are provided to demonstrate illustrative environments and technology areas in which at least some embodiments of the invention described herein may be practiced.

BRIEF DESCRIPTION OF THE FIGURES

The advantages and aspects of the present invention will be more fully understood in conjunction with the following detailed description and accompanying drawings, wherein.

The drawings are not necessarily to scale, emphasis instead generally being placed upon illustrating the principles of the invention. In the Figures, like numbers denote like elements.

DETAILED DESCRIPTION

Before discussing the details of the invention, a preliminary discussion is provided giving an overview an exemplary type of computing environment in which at least some embodiments of the invention may be realized, followed by a brief overview of operation of one embodiment of the invention, followed by detailed descriptions of the various aspects, components, and processes of embodiments of the invention. For the purpose of clarity, technical material that is known in the technical fields related to the invention has not been described in extensive detail, so that the embodiments of the invention are not unnecessarily obscured.

It should be appreciated that the present invention can be implemented in numerous ways, including as a process, an apparatus, a system, or a computer readable medium such as a computer readable storage medium or a computer network wherein program instructions are sent over optical or electronic communication links and stored at and executed on a computer system. The methods and apparatus of at least some embodiments of the invention may take the form, at least partially, of program code (i.e., instructions), such as a software application, embodied in tangible computer readable program media (also known in the art as machine readable program media and computer-usable storage media), such as floppy diskettes, CD-ROMs, hard drives, universal serial bus (USB) memory devices, memory cards, random access or read-only memory, or any other tangible or physical machine-readable storage medium, wherein the program code can be executed by the processor of a computer system to implement any of the processes or methods described herein. In addition, when the program code embodied on the computer readable program medium is loaded into and executed by a machine, such as a computer, the machine itself becomes an apparatus for practicing the invention. The methods and apparatus of the invention also may be embodied in the form of program code that is transmitted over some transmission medium, such as over fiber optics, electrical wiring or cabling, then stored at and executed on a computer system, where the program code combines with the processor to provide a unique apparatus that operates analogously to specific logic circuits. The program code (software-based logic) for carrying out the method is embodied as part of the system described below. It should be noted that the order of the steps of disclosed processes may be altered within the scope of the invention.

Figure 1A:
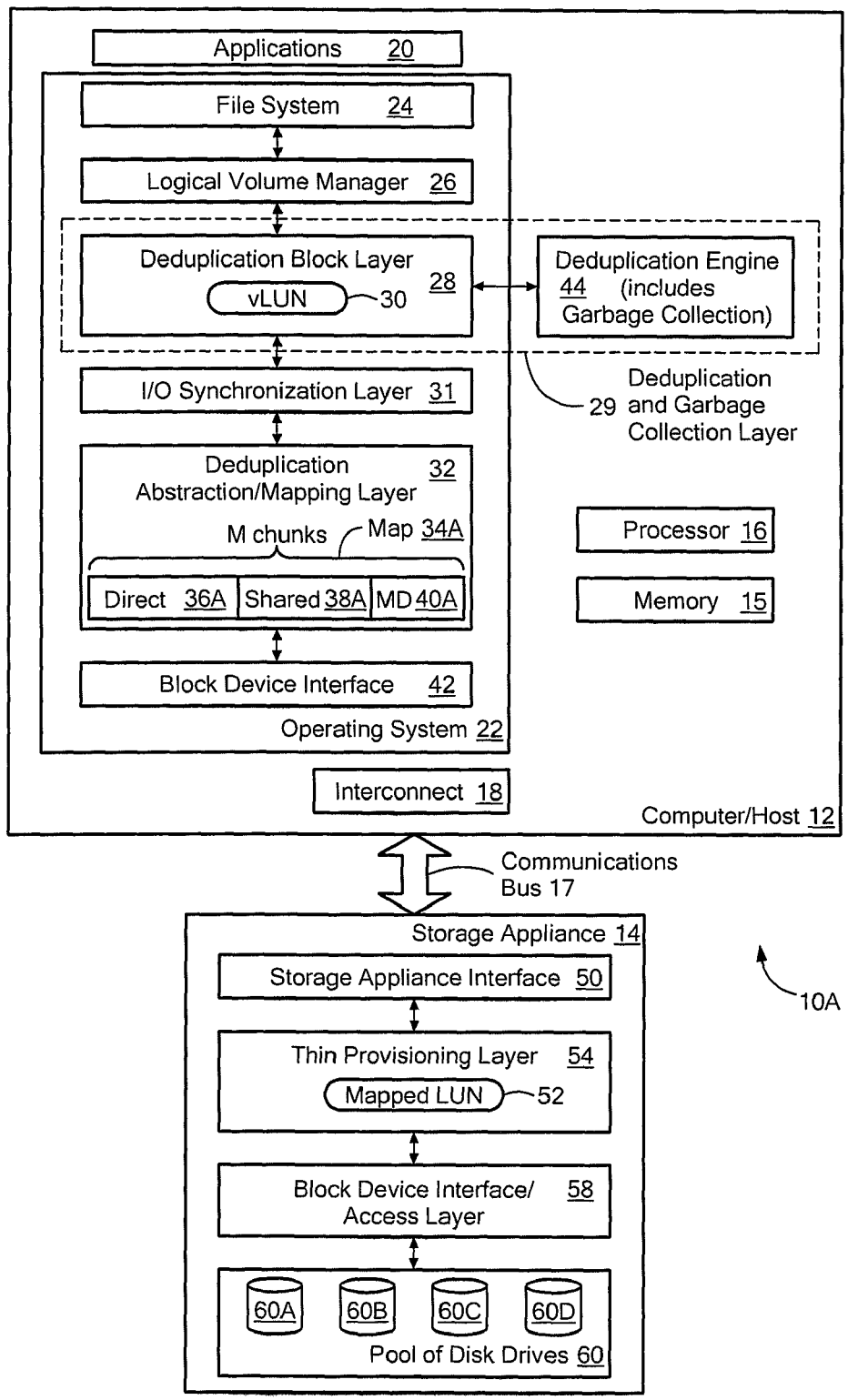
FIG. 1A is a first illustrative block diagram of an exemplary computer system in which at least one embodiment of the present invention can be embodied, in which deduplication-related layers are implemented on a host and a thin provisioning layer is implemented on a storage appliance.
Figure 1B:
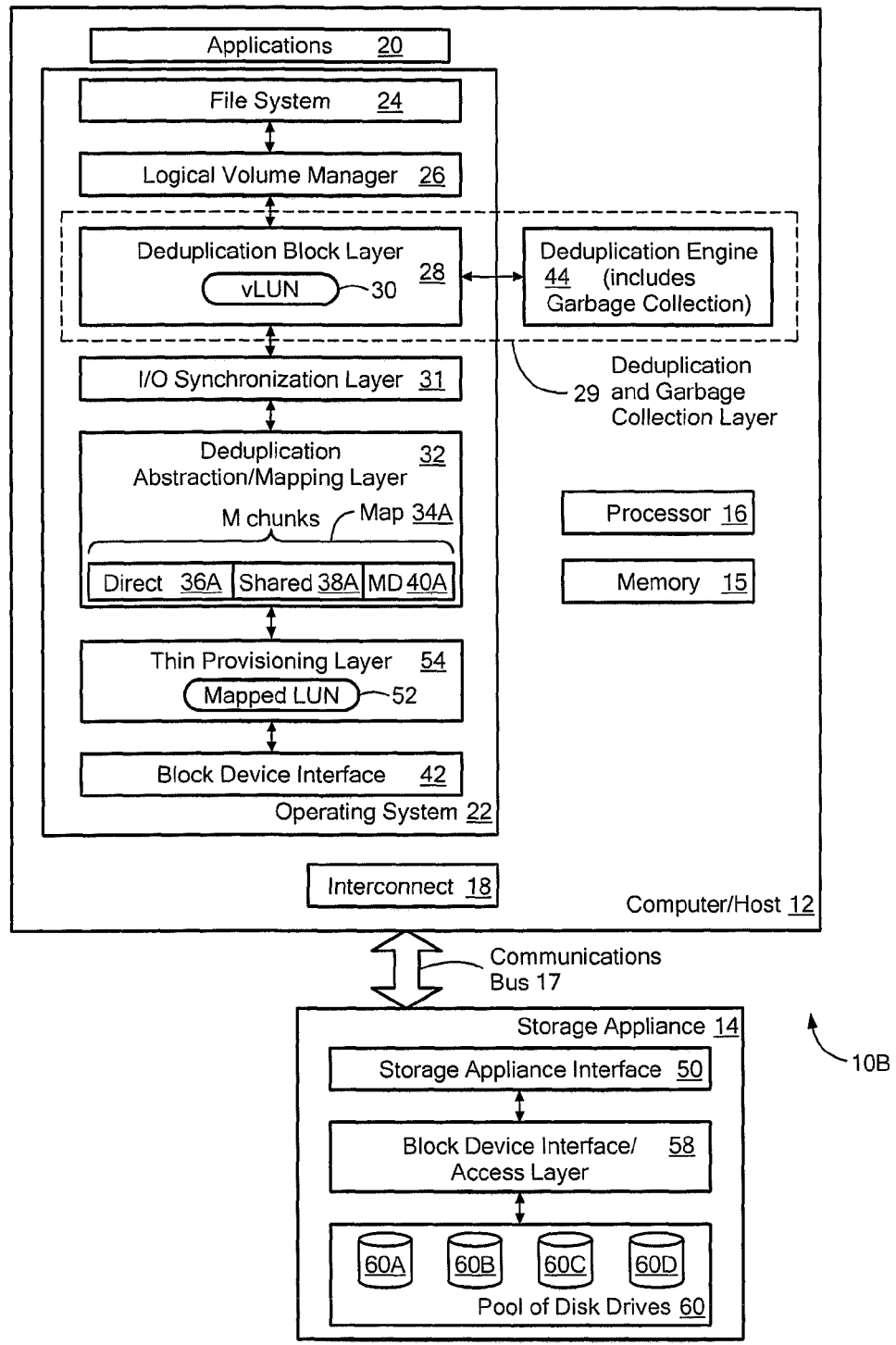
FIG. 1B is a second illustrative block diagram of an exemplary computer system in which at least one embodiment of the present invention can be embodied, in which deduplication-related layers and a thin provisioning layer are both implemented on a host.
Figure 1C:
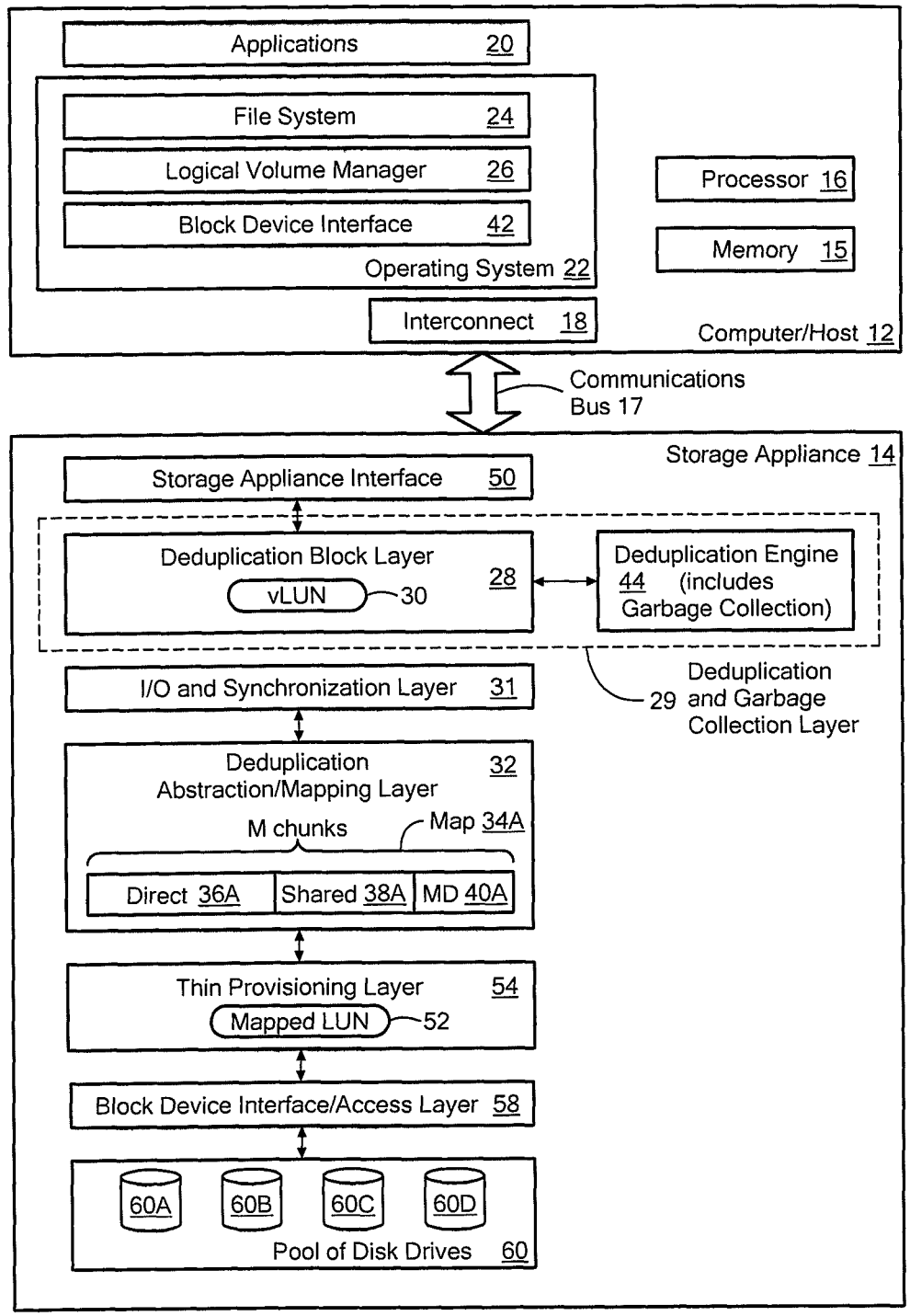
FIG. 1C is a third illustrative block diagram of an exemplary computer system in which at least one embodiment of the present invention can be embodied, in which deduplication-related layers and a thin provisioning layer are implemented on a storage appliance.
Figure 1D:
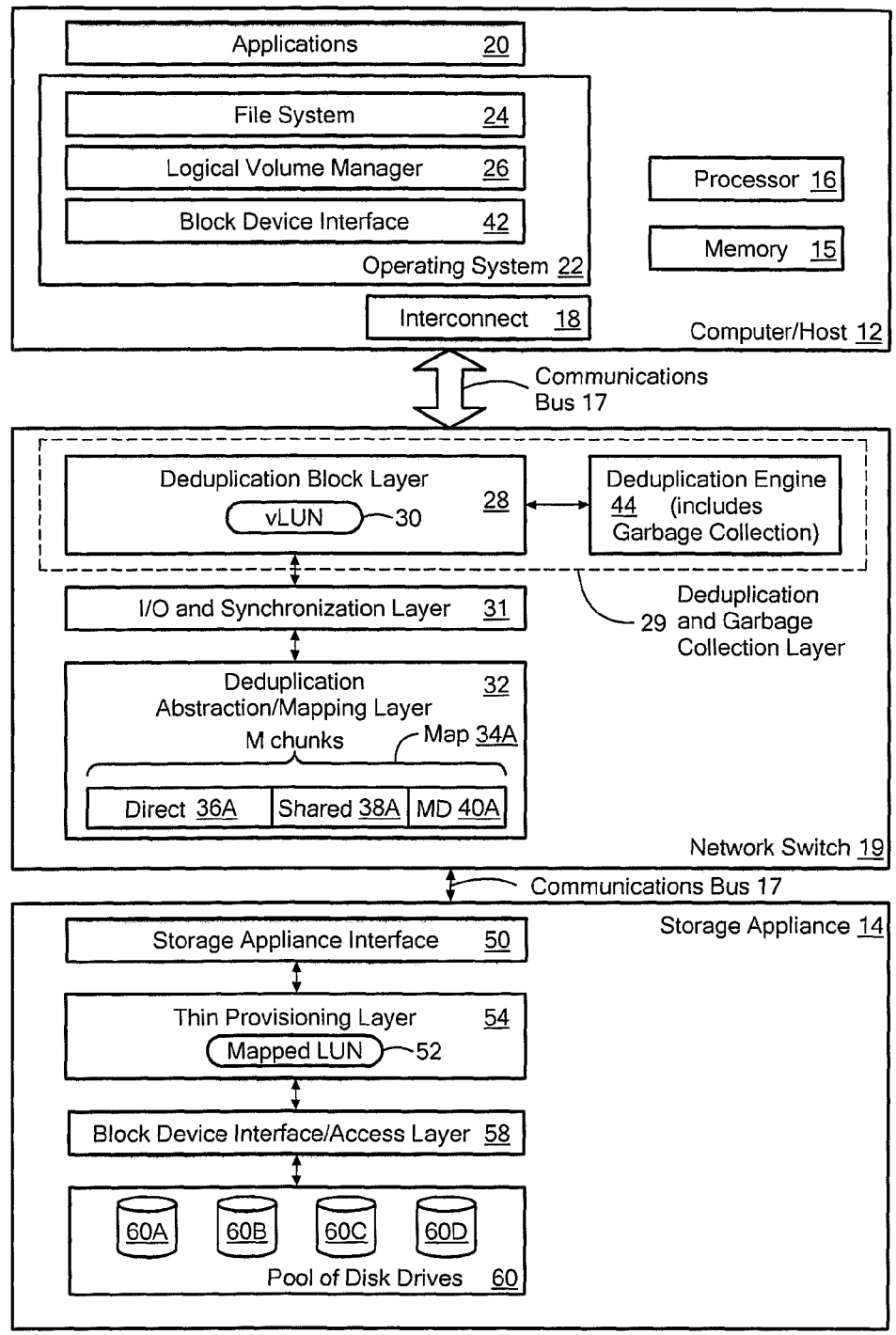
FIG. 1D is a fourth illustrative block diagram of an exemplary computer system in which at least one embodiment of the present invention can be embodied, in which deduplication-related layers are implemented on a network switch and a thin provisioning layer is implemented on a storage appliance.
Figure 1E:
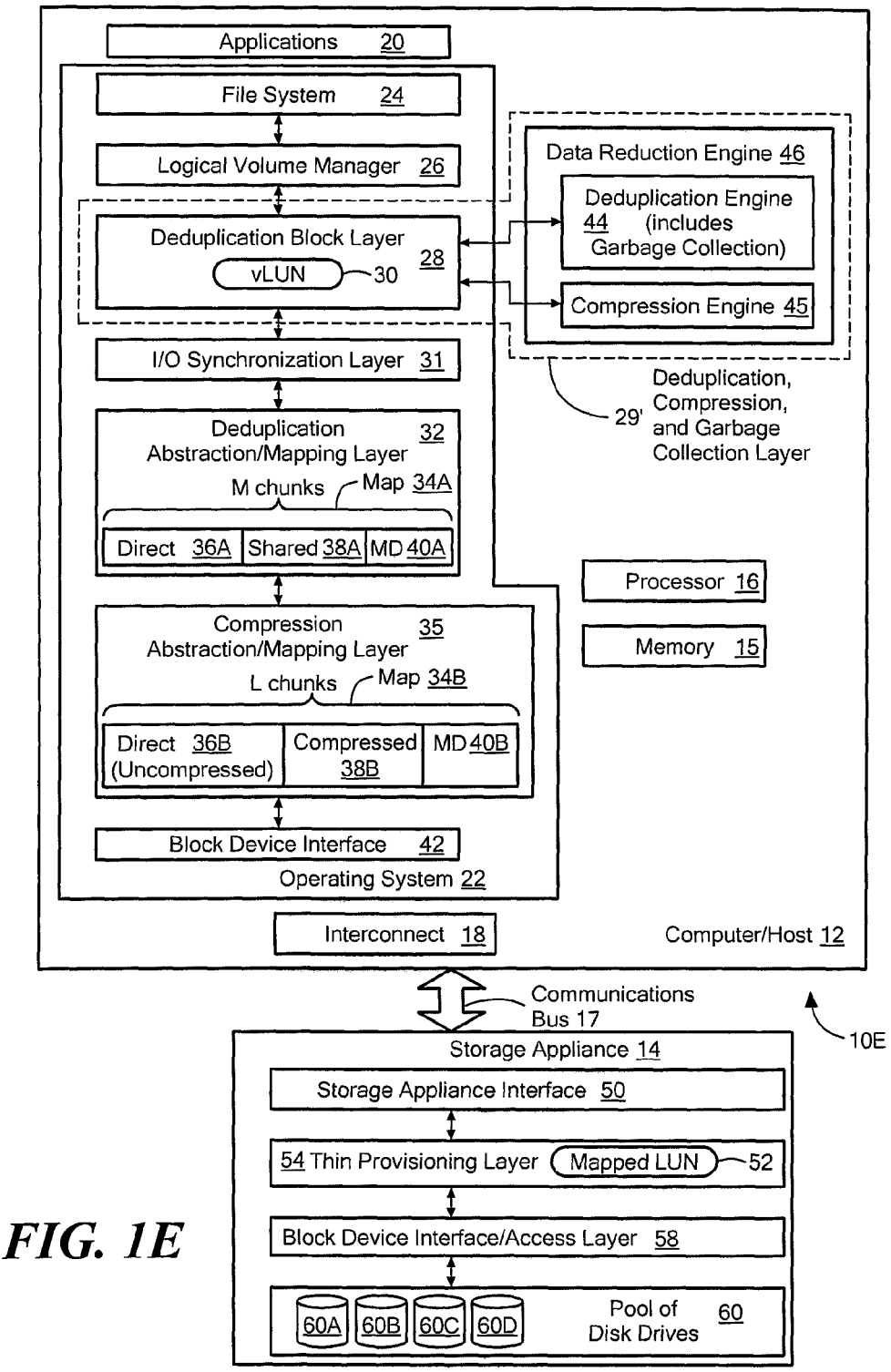
FIG. 1E is a fifth illustrative block diagram of an exemplary computer system in which at least one embodiment of the present invention can be embodied, in which deduplication and compression related layers are implemented on a host and a thin provisioning layer is implemented on a storage appliance.
Figure 2:
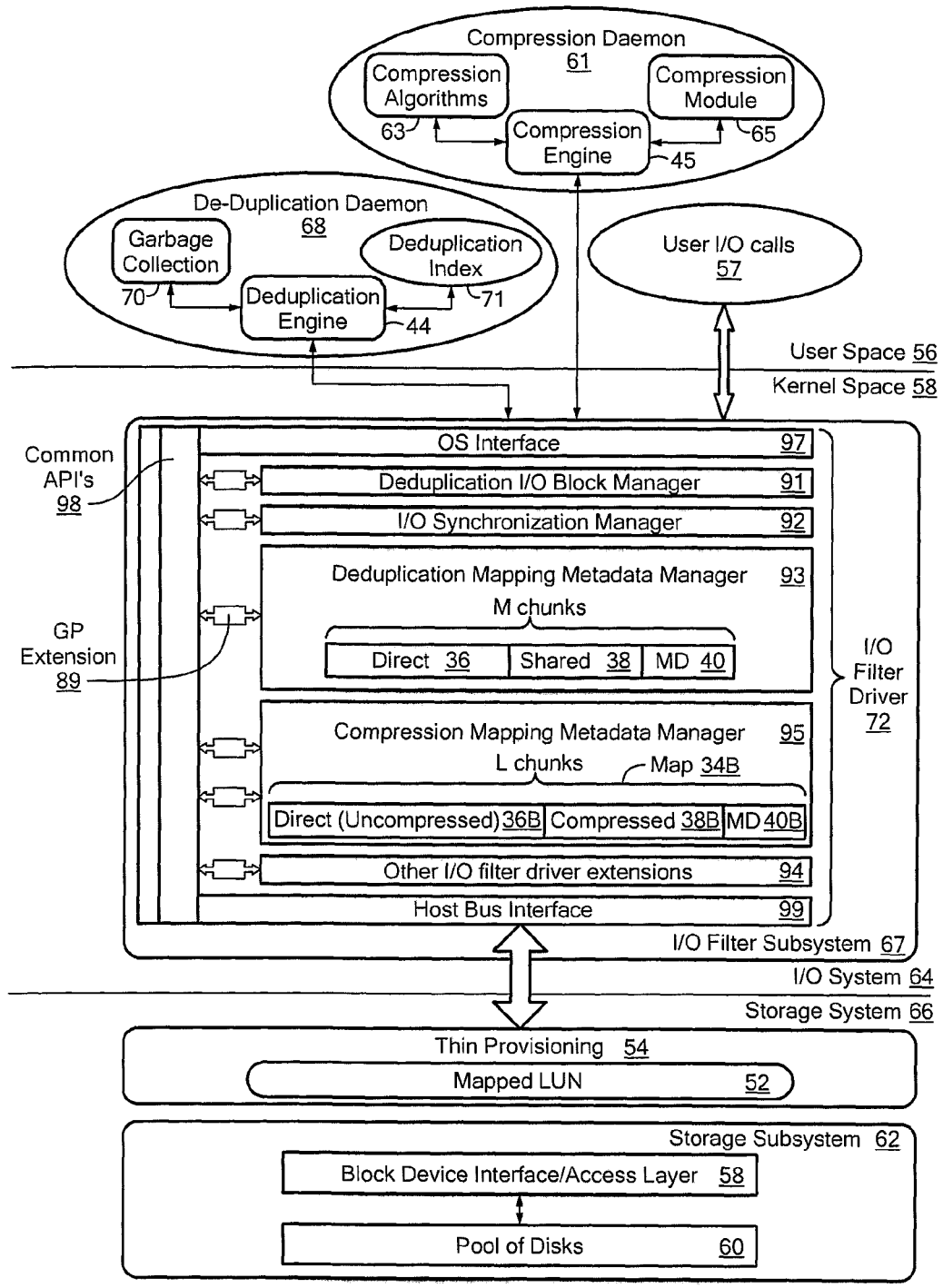
FIG. 2 is an exemplary software architecture in which at least one embodiment of the invention can be embodied.

FIGS. 1A through 1E each include illustrative block diagrams of respective exemplary computer systems 10A-10E in which at least one embodiment of the present invention can be embodied, and FIG. 2 is an exemplary software architecture in which at least one embodiment of the invention can be embodied.

FIG. 1A is a first illustrative block diagram of an exemplary computer system 10A in which at least one embodiment of the present invention can be embodied, in which deduplication-related layers 28, 31, 32, and 44 are implemented on a host 12 and a thin provisioning layer 54 is implemented on a storage appliance 14. The elements shown in FIGS. 1A-1E are described in greater detail herein.

FIG. 1B is a second illustrative block diagram of an exemplary computer system 10B in which at least one embodiment of the present invention can be embodied, in which deduplication-related layers 28, 31, 32, and 44 and the thin provisioning layer 54 are both implemented on a host 12.

FIG. 1C is a third illustrative block diagram of an exemplary computer system 10C in which at least one embodiment of the present invention can be embodied, in which deduplication-related layers 28, 31, 32, and 44 and a thin provisioning layer 54 are implemented on a storage appliance 14.

FIG. 1D is a fourth illustrative block diagram of an exemplary computer system 10D in which at least one embodiment of the present invention can be embodied, in which deduplication-related layers 28, 31, 32, and 44 are implemented on a network switch 19 and thin provisioning layer 54 is implemented on a storage appliance 14.

FIG. 1E is a fifth illustrative block diagram of an exemplary computer system 10E in which at least one embodiment of the present invention can be embodied, in which deduplication related layers 28, 31, 32, and 44 and compression related layers 35 and 45 are implemented on a host 12 and thin provisioning layer 54 is implemented on a storage appliance 14.

The deduplication (and, where applicable, compression) processes described herein work in substantially the same manner for the embodiments of FIGS. 1A through 1E. Further, although each of the embodiments of FIGS. 1A through 1E shows a system that uses the space reclamation process of deduplication, whether alone or in combination with the space reclamation process of compression (FIG. 1E), those of skill in the art will appreciate that the invention also can be implemented without deduplication (e.g., with only compression).

In addition, in each of the embodiments of FIGS. 1A-1E, input/output (I/O) goes through the deduplication abstraction/mapping layer 32 and/or the compression abstraction/mapping layer 35 prior to going through the thin provisioning layer 54. Thus, advantageously, in at least some embodiments of the invention, as long as the I/O path through the space reclamation-related layers maintains the same order as shown in FIGS. 1A-1E, the actual layers can be implemented anywhere, e.g., all on host 12 (FIG. 1B), all on storage appliance 14 (e.g., FIG. 1C), all on a switch (e.g., FIG. 1D), etc. The I/O path order through the layers that is preserved, in at least one embodiment of the invention, is this order: deduplication block layer 28, then I/O synchronization layer 31, then the mapping metadata layers (i.e., deduplication abstraction/mapping layer 32 and (optionally) compression abstraction/mapping layer 35, where the deduplication abstraction/mapping layer 32 and the compression abstraction/mapping layer 35 could be in either order) then the thin provisioning layer 54 (which has its own metadata). In this embodiment, other layers can be disposed between any of the layers 28, 31, 32, 35, and 54, so long as the I/O path follows that order of layers.

To simplify the explanation of the principles of the invention, the methods and other features described herein are discussed primarily in connection with FIG. 1A (and, for compression, in connection with FIG. 1E), but the invention is not limited to the arrangement of FIGS. 1A and 1E

Those skilled in the art will appreciate that computer systems embodying the invention need not include every one of the elements described herein and that equivalents to each of the elements are intended to be included within the spirit and scope of the invention.

Referring now to FIGS. 1A and 2, the host computer 12 (also referred to herein as a general purpose computer 12) includes memory 15, a processor 16 (which can include one or more central processing unit (CPU) chips) and one or more interconnects 18 (e.g., a host bus adapter) that controls communication between the processor 16 and one or more storage appliances 14 via communication bus 17. The memory 15 stores programs and/or data that the processor 16 uses as it executes operations; in addition, as described further herein, the memory 15 also can help to store copies of certain mapping information to make reads and/or writes of deduplicated logical devices more efficient. For example, in one embodiment, the memory 15 stores copies of the shared bit table 80A (see shared bit 80A of FIG. 4A, described further herein) and the shared map 82A (see shared map 82A of FIG. 4A), which are in use during the read and write processes, as explained further herein.

Referring again to FIGS. 1A and 2, a data deduplication process (described further herein) runs in the computer system 10A to reduce redundant data stored in the storage appliance 14. The deduplication process identifies redundant data in the storage capacity and replaces the redundant data with a reference/pointer to a copy of the data that is stored elsewhere in the storage appliance 14. As will be explained further herein, an advantageous mapping solution and corresponding read and write algorithms, provided for in at least some embodiments of the invention, help the deduplication process and/or a compression process and input/output (I/O), including reads and writes, to be more efficient than known deduplication and/or compression processes. Further, in another aspect of the invention, the allocation features of virtual provisioning are used to help reclaim space (referred to herein as chunks that have undergone data reduction or space saving processes, or alternatively as so-called "unneeded chunks"), where the space (e.g., the chunk) has been identified using the data reduction and space saving methods (e.g., deduplication, garbage collection, and compression) discussed herein. In the case of deduplication, the chunk is unneeded because the data is shared and stored elsewhere; in the case of compression, the chunk is unneeded because the data has been compressed and stored elsewhere. With either deduplication or compression (or even both), an unneeded chunk is a physical chunk that is no longer needed for data storage, and thus can be returned to the pool of data storage for re-use.

To practice the invention, the computer system 10A can include any devices useful for providing the described functions, including well-known data processing and storage and communication devices and systems such as computer devices and/or systems used as hosts in user systems with processing, memory, and input/output components, and server devices configured to maintain and then transmit digital data over a communications network, these devices including but not limited to a personal computer (PC), laptop computer, client, network appliance, storage appliance, server, workstation, personal digital assistant (PDA), mobile communications device (including so-called "smart phones"), an interconnected group of general purpose computers, host computer systems, enterprise computer system, Ethernet networks, intelligent switches running in a SAN or in a Fibre channel or Ethernet Network, etc., running any one of a variety of operating systems. For example, in one embodiment, the computer system 10A can be implemented as part of a storage area network (SAN) environment, where the SAN itself may include thousands of different inter-related logical and physical entities. In the case of a Fibre Channel SAN, these entities, which comprise the connections between hosts 12 and storage appliances 14, may include Fibre Channel host bus adapters, Fibre Channel switches, Fibre Channel routers, a network switch, and the like; an example of this type of environment is illustrated in FIG. 1D herein.

The general purpose computer system 10 advantageously includes and/or is capable of communicating with network and/or storage appliances, devices or systems (including enterprise storage systems, remote storage systems, intelligent storage systems, disaster recovery systems, etc.) that store data and/or computer programs used by the general purpose computer system. Data typically is communicated in digital format following standard communication and transfer protocols. The data storage resources, also referred to as storage appliances, are generally described as disk, flash, optical, and tape devices that implement RAID and other storage techniques and that may use SCSI and other I/O, data transfer, and storage protocols, but the invention is not intended to be limited to the example embodiments or to specific hardware and storage mechanisms as it is useful for nearly any computer environment.

Referring again to FIG. 1A, the computer system 10 includes a memory 15 (e.g., random access memory (RAM)) and a processor 16 (also referred to as a central processing unit (CPU)), which can be any type of microprocessor. In addition, those of skill in the art who are familiar with such general purpose computer systems 12 know that such systems can include many elements well known in the art but not explicitly illustrated in FIG. 1, such as an input/output (I/O) controller, a network interface, a display device, one or more input devices, and, optionally, one or more removable storage devices, including but not limited to a CD/DVD drive unit, a floppy disk drive unit, a tape drive unit, a PCMCIA or other card drive, a USB-based flash drive unit, and the like, and a data bus coupling these components to allow communication therebetween.

In at least some embodiments of the invention, one or more computer programs (such as applications 20 and an operating system 22) define the operational capabilities of the computer system 12. Operating systems usable with at least some embodiments of the invention include (but are not limited to) systems available from Sun Microsystems, and running the Solaris operating system (a version of Unix); HP-UX (a Hewlett-Packard operating system, running a Hewlett-Packard version of the Unix operating system), available from Hewlett-Packard Corporation; AIX (an IBM version of Unix), available from IBM Corporation; hypervisors such as Hyper-V (available from Microsoft Corporation) and/or ESX and ESXI (available from VMware), and/or any other operating system such as LINUX, or the WINDOWS family of operating systems (available from Microsoft Corporation). These programs can be loaded into the computer system 10 in many ways, including but not limited to a hard disk drive, a CD/DVD drive, and a network interface. Alternatively, the programs can reside in a permanent memory portion (e.g., a read-only-memory (ROM)) chip) of the main computer system 12 memory. Further, those of skill in the art will recognize that the computer system 12 can include specially designed, dedicated, hard-wired electronic circuits that perform some or all of functions described herein without the need for instructions from computer programs.

One environment in which the computer system 10 may be used is as part of an enterprise storage system. An exemplary storage area network (SAN) provides a communication infrastructure, including physical connections between computer systems, storage devices, and a management layer, which organizes the connections, storage devices, and computer systems. For example, at least some embodiments of the systems, methods, and apparatuses of the invention described herein are intended for use in connection with storage area networks (SANs) that include data storage systems, such as the Symmetrix Integrated Cache Disk Array System, the CLARiiON Disk Array System, and/or the Celerra family of storage systems, all of which are available from EMC Corporation of Hopkinton, Mass., as well products provided by vendors other than EMC Corporation, especially SANs having disk arrays where thin provisioning can be implemented. Such data storage device systems and their implementation are fully described in many publicly available documents from EMC Corporation, as well as in U.S. Pat. No. 6,101,497 issued Aug. 8, 2000, and also in U.S. Pat. No. 5,206,939 issued Apr. 27, 1993, each of which is assigned to EMC (the assignee of this invention) and each of which is hereby incorporated by reference. Consequently, the discussion herein makes only general references to the operation of such systems.

Referring again to the particular embodiment shown in FIG. 1A, the operating system 22 includes several components presented in FIG. 1 as layers, including a file system 24, logical volume manager (LVM) 26 and block device interface 42. The block device interface 42 can include elements known in the art, such as host bus adapter (HBA) drivers, and the like. The deduplication block layer 28 manages one or more virtualized LUNs 30 (vLUN 30), that are presented by the I/O filter driver 72 (not illustrated in FIG. 1A, but shown in the software architecture of FIG. 2) to the layers above it, such as the LVM 26, file system 24, and applications 20.

When an application 20 is reading or writing data, it communicates (i.e., reads and writes) with one or more vLUNs 30. As explained further herein, the I/O filter driver 72 (FIG. 2) containing deduplication I/O block manager 91, filters those reads/writes and layers 28 and 32 are used to transform them by performing the steps described in the methods of the invention described herein. That is, the vLUN 30 is a logical representation of the mapped LUN 52 as seen by entities above the I/O filter driver 72. The vLUN 30, as presented by the deduplication block layer 28, helps to manage access to and virtualize some or all of the storage capacity presented by the storage appliance 14 (and/or optionally other storage appliances 14, not shown). The mapped LUN 52 is used by the I/O filter driver 72 in the same manner as any other logical unit, but the mapped LUN 52 actually is hidden from layers above the I/O filter driver 72 (FIG. 2), because the I/O filter driver 72 presents the vLUN 30 to these layers, as is well understood in the art. The vLUN 30 can be used for raw access, file systems can be mounted on it, and it can be placed under control of the LVM 26. The mapped LUN 52 and its virtual provisioning are described further below.

Referring again to the embodiment of FIG. 1A, the communications bus 17 can include any of a number of different types of communication links, with the interconnect 18 and storage appliance interface 50 being adapted to communicate using an appropriate protocol via the communication buses 17 coupled there between. For example, the communication bus can be implemented as a small computer system interface (SCSI) bus, an Internet-SCSI (iSCSI) bus, a Fibre Channel fabric, or Fibre Channel over Ethernet (FCoE). Other implementations are, of course, possible. In at least one embodiment, however, the communications bus 17 is not required, especially if the space reclamation layers 29, 31, 32 (and/or optionally 35—see FIG. 1E) and the thin provisioning layer 54 are physically part of the same device, apparatus or machine. When the layers 29, 31, 32 (and/or optionally 35) are physically located on the same device as layer 54, communications therebetween are accomplished using a procedure call mechanism, as one of skill in the art will appreciate. This also is applicable, of course, between any two of the layers that are physically located on the same device.

The storage appliance 14 can include any type of persistent storage, such as hard disks (e.g., any Fibre Channel or SATA disk drive) and/or Enterprise Flash Drives (EFD) where copies of data (e.g., files, executables and the like), are stored. The copies of data can be primary copies or duplicate (e.g., backup) copies. The storage appliance 14 (which can include logical units (LUNS), such as the mapped LUN 52, explained further below) makes storage resources available to the host computer 12 for assignment to entities therein, such as the file system 24, the logical volume manager 26, an I/O filter subsystem 67 with I/O filter driver 72 (see FIG. 2), and a block device interface 42.

As shown in FIG. 1A, storage appliance 14 includes a storage appliance interface 50 that interfaces to the host computer 12 via the communications bus 17. The block device interface/access layer 58 links all block devices to look like an array of blocks and performs, if applicable, all RAID functions. The storage appliance 14 also includes one or more disk drives 60A, 60B, 60C, 60D. If there is more than one disk drive, e.g., multiple disk drives 60A, 60B, 60C, 60D, the multiple disk drives 60A-60D can combine to form a pool 60 of disk drives. The pool 60 of disk drives can, in some embodiments, be grouped into an array, but this is not required. The thin provisioning layer 54 allocates chunks to the mapped LUN 52 as needed (i.e., when they are written to) and the thin provisioning layer 54 gets the needed chunks from the pool 60. A typical disk pool 60 can, of course, include elements not illustrated in FIG. 1a, but well known to those of skill in the art, such as a disk array controller, a cache, disk enclosures, and a power supply.

Referring again to FIG. 1A, the storage appliance 14 includes a construct called a mapped LUN 52 that is implemented using the thin provisioning layer 54 (thin provisioning is sometimes referred to in the art as virtual provisioning). The mapped LUN 52 interfaces between the host 12 and the pool 60 to create, via thin provisioning layer 54, a mapping between the mapped LUN 52 (which can be thought of as an array of chunks) and the actual location of each chunk on the disk drives in the pool 60. The vLUN 30 creates a second mapping between the array of chunks presented by the vLUN 30 and the storage provided by the mapped LUN 52. The array of chunks presented by the vLUN 30 to an application 20 presents more storage to the application 20 than is actually physically allocated (assigned) to the vLUN 30 by the storage pool 60 at a given time, where actual physical storage is allocated to vLUN 30 for use by the application 20 from the pool 60 only when the (additional) storage actually is written to by the application 20.

Thin provisioning, as is known to those of skill in the art, helps to reduce the storage inefficiency that can result when it is known that applications 20 will request more storage than they will ever use. The thin provisioning layer 54 allocates storage from the pool 60 in allocation units, which also are known in the art as data storage extents, or, simply storage extents. Each data storage extent has a predetermined size and corresponds to the minimum quantum of storage allocated at a time from the pool 60. Exemplary sizes of data storage extents used in at least some embodiments of the application include sizes such as 4 KB, 8 KB, and 16 KB, but these sizes are not limiting. The size of the data storage extent is implementation dependent, as understood by those of skill in the art, and may vary based on the type of storage system used and/or type of disk drive in the pool 60.

With thin provisioning, the mapped LUN 52 actually reserves fewer than the maximum number of data storage extents specified by an application, without the application 20 being aware of this thin provisioning. In the event that an application 20 actually desires to write to more space than was thinly provisioned for the mapped LUN 52, extra data storage extents may be allocated from the pool 60 (if any exist). Further, the size of the pool 60 can be non-disruptively and dynamically increased (e.g., automatically, by policy) by adding additional disks to the pool 60. The mapped LUN 52 also can include data structure and storage extent pointer manipulation capabilities for managing the allocated data storage extents. For example, the thin provisioning layer 54 includes a mapping software functionality that provides a mapping service to optimize the placement and use of physical storage used by a mapped LUN 52 having thin provisioning 54.

Referring again to FIGS. 1A and 2, in at least some embodiments of the invention described herein, the host computer 12 further includes a deduplication engine 44, and the operating system 22 further includes a deduplication block layer 28 (which provides the vLUN 30) and a deduplication abstraction/mapping layer 32 (which includes a map 34, described further herein). The deduplication block layer 28 can be managing one or more vLUNs 30. The deduplication engine 44 communicates with the operating system 22 (in particular, with the deduplication block layer 28). The deduplication engine 44 provides block-level deduplication services for the host computer 12, and performs deduplication on chunks of the data addressed by or referenced by the deduplication block layer 28; that is, the deduplication engine 44 performs deduplication on data stored by the vLUN 30 managed by the deduplication block layer 28.

Note also that, in at least one embodiment of the invention, including at least the embodiment illustrated in FIG. 1E, the deduplication engine 44 is part of a data reduction engine 46, where the data reduction engine also includes a compression engine 45 operable to perform data compression on a deduplication block device managed by the deduplication block layer 28; the deduplication block layer 28 and data reduction engine 46 together form a deduplication, compression, and garbage collection layer 29'. As those of skill in the art can appreciate, an embodiment of the invention also can include at least one embodiment where the data reduction engine 46 includes only the compression engine 45 and not the deduplication engine 44, although this specific embodiment is not illustrated in the Figures. It also should be understood that the term "data reduction engine" is not intended to require only processes where the data being stored is necessarily physically compacted or reduced in size, as is the case with compression. Rather, the term "data reduction engine" encompasses any processes that result in a reduced use of physical storage required to store data. For example, deduplication, as described herein, is considered a type of data reduction process, because deduplication can (if duplicates are found) result in reduction of the number of copies of data stored in physical storage, thus resulting in reduced use of physical storage required to store the same data. Similarly, the term "data reduction process," as used herein, is not limited to processes that physically reduce or compact data, but is intended to encompass any process that has an end result of reducing the amount of physical storage required to store data.

The data reduction chunk size (that is, the quantity of data that is deduplicated or compressed at a time) also is referred to herein as the size of the deduplication chunk, or size of the compressed chunk, or, generically, the size of the unneeded chunk. In one embodiment, the size of this unneeded chunk is defined as being a size X, where X advantageously is a non-zero integer multiple of the size of the data storage extent (allocation unit) of the thin provisioning layer 54, as is explained further below. For compression to save space, in accordance with at least one embodiment of the invention, the compression has to compress a nonzero integer multiple of the storage extent size into a smaller nonzero integer multiple of the storage extent size. In a further embodiment, the compression layer saves space by "packing" multiples of compressed chunks into a single chunk. For example, assume that compression starts with first compressing a chunk of size 4x, and the resultant compressed chunk had a size of 1.5x.

Another chunk of size 4× is compressed to a chunk of size 2.5×. The two compressed chunks (the 1.5× chunk and the 2.5× chunk) are stored together in a single chunk of size 4×, thereby saving a 4× of space. This "packing" of compressed chunks together can, in one embodiment, use a variation of the metadata mapping for compression shown in FIG. 4B (which is an illustration showing in greater detail the metadata portion of the mapping layout of FIG. 3A, in accordance with one embodiment of the invention), where the compressed metadata map 82B is adapted to provide information relating to the packing, in addition to the other information (the metadata map 82B is described further herein). For example, the information relating to the packing, in one embodiment, varies from the metadata layout 34B for compression of FIG. 3B in that the compressed metadata map 82B uses offsets into the compressed region 38B, instead of a logical chunk address (LCA).

As the block diagram 10A of FIG. 1A and as the software architecture of FIG. 2 illustrate, the deduplication engine 44 (and/or, in one embodiment, the compression engine 45 or data reduction engine 46) effectively communicates with the mapped LUN 52 of the storage appliance 14 via the I/O filter driver 72, which includes its own logical representation of the deduplication block layer 28, namely, the deduplication I/O block manager 91. In FIG. 1A, the deduplication engine 44 is illustrated as part of a deduplication and garbage collection layer 29 that is operating on the host computer 12. Similarly, in FIG. 1E, the data reduction engine 46 (which includes both a deduplication engine 44 and a compression engine 45) is illustrated as part of a deduplication, compression, and garbage collection layer 29' that is operating on the host computer. However, as noted previously, the deduplication engine 44 (or compression engine 45, or data reduction engine 46) also can also be installed in the storage appliance 14 (as shown in FIG. 1C), or in a switch (as shown in FIG. 1D) or even at a remote client or server (not shown, but well understood by those of skill in the art in connection with FIGS. 1A-1E), so long as the deduplication engine 44 is in operable communication with the rest of the deduplication and garbage collection layer 29, including the chunks of data that are being deduplicated.

Advantageously, the deduplication engine 44 can be located anywhere where it can operate on the chunks of data being deduplicated, even without the presence of either the host computer 12 or the storage appliance 14 (that is, the space reclamation processes described herein can be implemented on a single platform, without a host or an array), so long as the deduplication engine coordinates through synchronization with the aforementioned I/O path (e.g., is processed in the order described above; namely, the deduplication block layer 28, then the I/O synchronization layer 31, then the mapping layers (e.g., deduplication abstraction/mapping layer 32 and/or compression abstraction/mapping layer 35, in either order), then the thin provisioning layer 54, with other layers permitted between any of these aforementioned layers permitted so long as this order is maintained.

The above-described flexibility of where the deduplication engine 44 can be installed is equally applicable to the data reduction engine 46 and/or the compression engine 45, as will be appreciated by those of skill in the art, so long as the synchronization with the I/O path through layer 92 (FIG. 2) is maintained.

In at least one embodiment of the invention, the deduplication engine 44 cooperates with the garbage collection process (described further herein in connection with FIGS. 11A, 11B and 11C) and/or the allocation mechanism provided with thin provisioning 54 to perform block-level deduplication on chunks stored in vLUN 30, and thus effectively processes data that physically is stored in storage appliance 14, to identify and reduce duplicative/redundant data and reclaim the space. In connection with the block-level deduplication used in the embodiments of the invention, the deduplication engine 44 can implement virtually any deduplication algorithm configured to identify redundant data and replace the redundant data with a reference to a single instance of the data, where, in at least some of the embodiments of the invention described herein, metadata is used to locate the single instance of the data (via the shared map, described further herein). During block-level deduplication, a data object, which may be a file, a block, a data stream, or some other form of data, is broken down into one or more chunks. Advantageously, in one embodiment of the invention, the chunk size for the deduplication engine 44 (also referred to herein as the data reduction chunk size, deduplication chunk size, compression chunk size, or unneeded chunk size) is sized so that it is a nonzero integer multiple of the size of a data storage extent used with thin provisioning. For example, in at least one embodiment of the invention, the invention is using a thin provisioning configuration that employs two different levels of allocation. In this configuration, storage is allocated out of the pool 60 in large extents, but storage provided to be used for writing data is allocated in very small extents. In this embodiment, the chunk size is a nonzero integer multiple of the size of the smaller extent size used for writing data. Having the size of the data reduction chunk be a nonzero integer multiple of the data storage extent size allows the deduplication and garbage collection processes to easily return storage no longer being used to hold application data (or metadata), because the thin provisioning allocation process already is configured to release data extents of a predetermined size (i.e., the data storage extent size), as needed by a given application. Thus, in this embodiment, the deduplication block layer 28 has reduced complexity and does not need to include or provide its own mapping and allocation mechanisms; instead the deduplication block layer 28 leverages the mechanism to do this that is already provided by a thin provisioning layer 54 that can be directed to release one or more data storage extents. If the nonzero integer multiple is greater than one, the virtual provisioning layer 54 can simply be directed to release that multiple of data storage extents.

During deduplication, each chunk of data is processed using a hash algorithm, such as the Message Digest Algorithm (MD5), officially defined by RFC1321 by the Massachusetts Institute of Technology (MIT) Laboratory for Computer Science, or an algorithm in the Secured Hash Algorithm (SHA) family, such as SHA-1, where the SHA family is designated by the National Security Agency in FIPS-180-1. This hash algorithm process generates an identifier, referred to as a fingerprint, digest, or hash, for each chunk, which is based at least in part on the contents of the chunk, where two chunks with identical contents will produce the same fingerprint. As those of skill in the art are aware, differing hash algorithms have differing strengths, and the length of the hash itself can affect the strength of the resulting fingerprint. As is well understood, the stronger the hash, the less likely it is that two chunks of data with different contents could be processed to generate the same fingerprint.

The digest is then stored in an index, which facilitates comparison of all of the digests, to search for duplicate digests. Duplicate digests generally indicate that the data chunks are identical, and can thus be subject to deduplication. In some instances, however, duplicate digests can indicate a so-called "hash collision," (which occurs when different chunks produce the same hash). In some instances, hash collisions can occur if the hash algorithm, used to generate the respective digests, is not strong enough. In one embodiment, to take into account the possibility of potential hash collisions, after two digests are found to be the same, the contents of the corresponding chunks are compared to confirm that the two chunks, are, in fact, the same, before the chunks are shared (i.e., before finally concluding that two data chunks are identical and can be subject to deduplication).

Figure 3A:
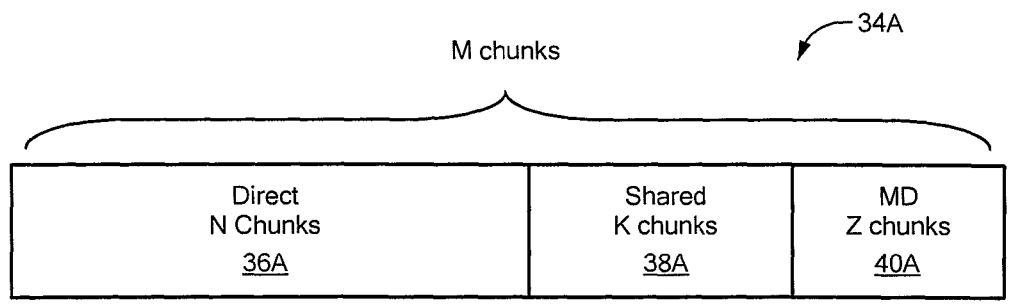
FIG. 3A is an illustration of a deduplication mapping layout for information stored on a virtual logic unit, for the computer system of FIG. 1A, in accordance with one embodiment of the invention.
Figure 4A:
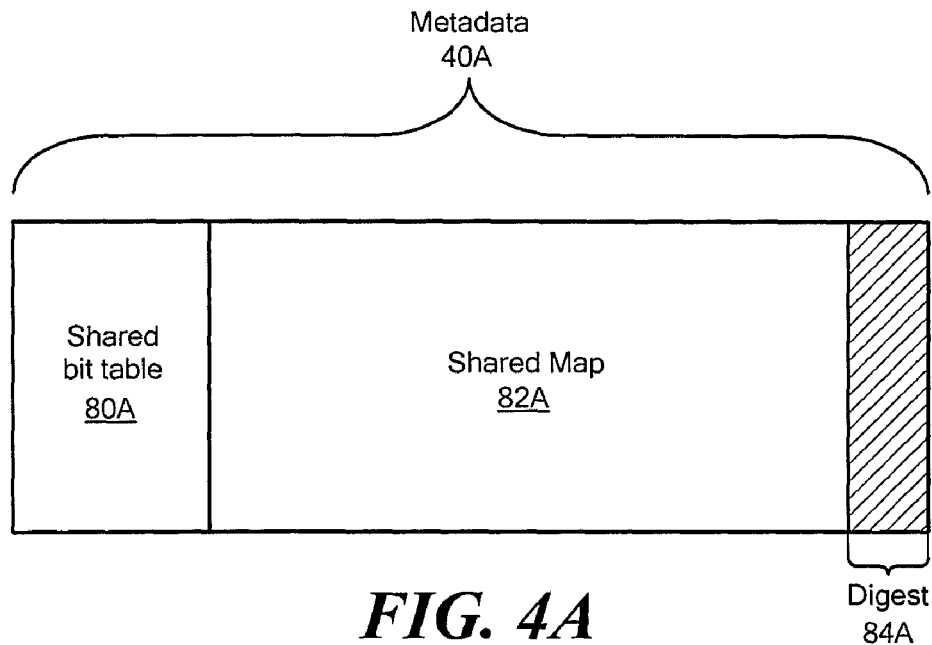
FIG. 4A is an illustration showing in greater detail the metadata portion of the mapping layout of FIG. 3A.

In one embodiment, if no matches are found for a given digest, the deduplication engine will treat the chunk associated with the given digest as a unique chunk with no duplicates already in storage. If, however, a match is found for a given digest, the chunk associated with the given digest is treated as being non-unique, because a duplicate exists. The duplicate chunk instead is referenced by storing the location of its data in an entry in the shared map 82A (FIG. 4A). During so-called "in band" deduplication processing, which occurs in some embodiments of the invention, the determination of whether a chunk has a duplicate is done as the data is being written. Advantageously, in another embodiment, the deduplication engine 44 performs the deduplication in an "out of band" or "post process" or "background" manner—that is, the deduplication engine 44 identifies and replaces redundant data with pointers after the data has already been written into storage. For example, the deduplication engine 44 can scan the direct region (36A) of mapped LUN 52 to search for two direct chunks that have the same digest (and thus are likely to be duplicates), and then write out metadata in the shared map 82A and shared bit map 80A (see FIGS. 3A and 4A) to indicate that the data formerly stored in the two direct chunks (that were found to be duplicates) is now stored in the shared region 38A.

Many deduplication algorithms are known in the art and can be implemented by the deduplication engine 44. In the embodiments described herein, the deduplication engine 44 operates using a fixed-chunk size, the fixed-chunk size being at least partially dependent on the data and type of application. Those of skill in the art will appreciate that the invention can be adapted in other embodiments to operate using a variable chunk size. Variable length chunk sizes can, in some instances, result in more complicated mappings and remappings than with fixed chunks; however, variable length chunk sizes are more readily implemented if the space reclamation-related layers 28, 31, 32, and/or optionally 35, and the thin provisioning layer 54, are all provided/implemented entirely within a storage appliance 14, as is illustrated in FIG. 1C. In at least some embodiments, furthermore, the thin provisioning layer 54 can even provide data storage extents of a variable size.

In this aspect of the invention, when the deduplication engine 44 has found redundant space and garbage collection has cleaned it of excess states and settings, it is efficient for the reclaimed physical chunks of space (i.e., the chunks of space that used to be occupied by the deduplicated chunks and/or compressed chunks (each of which also is referred to herein as unneeded chunks)) to be provided back to the logical unit (mapped LUN 52) via the same process that thin provisioning uses to release data storage extents no longer used by applications 20. This process for providing reclaimed chunks of space back to the logical unit is equally applicable when other data reduction processes, such as compression, are complete, as well. This is explained further herein.

Figure 3B:
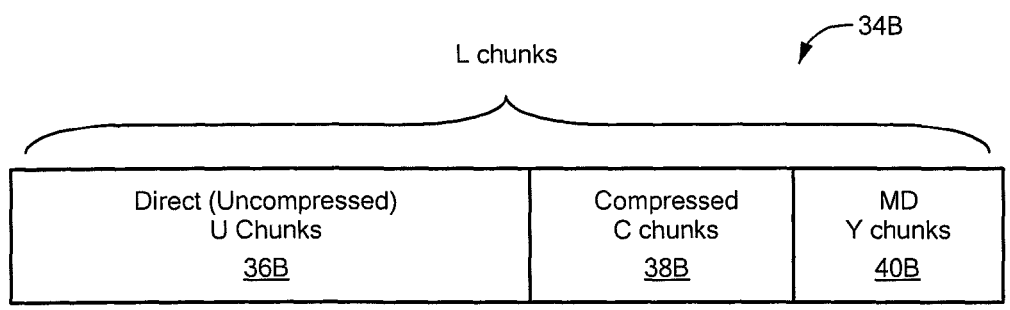
FIG. 3B is an illustration of a compression mapping layout for information stored on a virtual logic unit, for the computer system of FIG. 1E, in accordance with one embodiment of the invention.
Figure 4B:
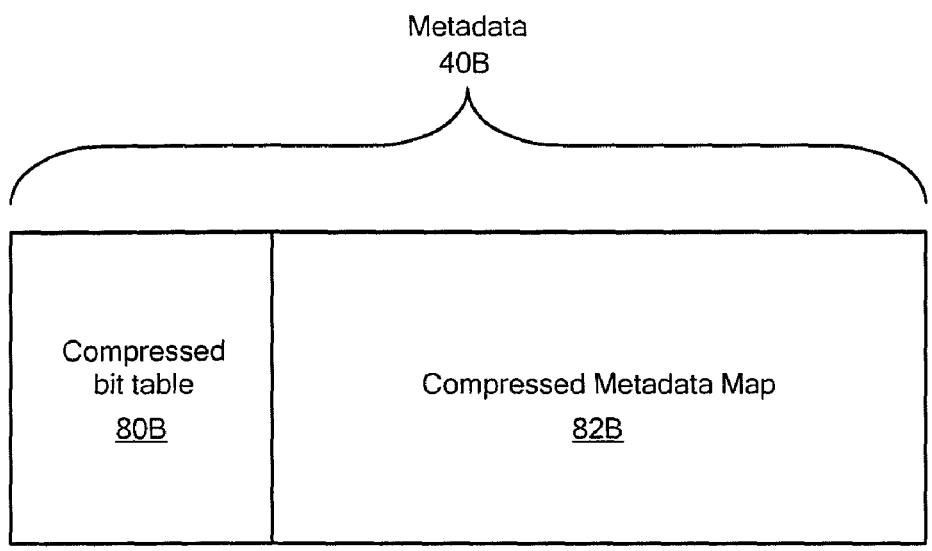
FIG. 4B is an illustration showing in greater detail the metadata portion of the mapping layout of FIG. 3B.

Referring again to FIG. 1A, the deduplication abstraction layer 32 is associated with the deduplication block layer 28 and defines a mapping for the deduplication block layer 28 using the layout 34A. FIG. 3A is an illustration of a deduplication mapping layout for information stored on a virtual logic unit, for the computer system of FIG. 1A, in accordance with one embodiment of the invention. Note also that FIG. 3B is an illustration of a compression mapping layout for information stored on a virtual logic unit, for the computer system of FIG. 1E, in accordance with one embodiment of the invention. Compression's use of this mapping layout is discussed later herein. FIG. 4A is an illustration showing in greater detail a metadata portion 40 of the mapping layout 34 of FIG. 3A. FIG. 4B is an illustration showing in greater detail the metadata portion of the mapping layout of FIG. 3B. As those of skill in the art will appreciate, the deduplication and compression mapping layouts of FIGS. 3A and 3B can be modified, if desired, to include additional regions, such as additional metadata regions that track other types of data. In a further embodiment, the mapping layouts of FIGS. 3A and 3B also can be combined. It also should be noted that the metadata mapping layouts of FIGS. 4A and 4B are provided by way of illustration and are not limiting to all embodiments of the invention. Those of skill in the art will appreciate that the metadata mapping layouts 4A, 4B can be varied without departing from the spirit and scope of the invention.

Referring now to FIGS. 1A, 2, 3A, and 4A, the layout 34A defines the mapping used by the deduplication block layer 28 to store the logical data of vLUN 30 onto the physical mapped LUN 52, where the deduplication block layer 28 implements the mapping and read/write code and where the vLUN 30 presents a logical device to applications. The layout 34A shows the layout of mapped LUN 52 as divided into three regions, including a direct region 36A, a shared region 38A, and a metadata (MD) region 40A. The deduplication block layer 28 configures mapped LUN 52 to have a total of M chunks, where M is a number that is greater than the size of the vLUN 30 (note that the size of the vLUN 30, N, corresponds to the size of the direct region 36A in the layout 34A of FIG. 3A). Note also that there can be many instances of vLUN 30, each with its own instance of mapped LUN 52. Advantageously, in one embodiment using deduplication:

$$M=(3N/2)+Z \qquad (1)$$

where Z is this size of the metadata region 40A.

Referring briefly to FIG. 3B, note that, in contrast to the equation (1) given above for the total number of chunks M for deduplication, the total number of chunks L for the compression layout 34B need not be the same total number as the number M shown for deduplication in FIG. 34A, nor are any of the other same requirements of Equation (1) above necessarily applicable to or required for the total number of compression chunks.

Referring to FIG. 3A, M represents the total number of chunks of a predetermined size X that are contained in the thinly provisioned mapped LUN 52. The chunk size X advantageously is a nonzero integer multiple of the size of data storage extent used with the thinly provisioned mapped LUN 52. Depending on the configuration and size of the thinly provisioned mapped LUN 52, the chunk size X can be virtually any size, including having the same size as that of the data storage extent (i.e., a multiple of one (1)). In one embodiment, the chunk size X is selected so that it is not smaller than the size of the thin provisioning allocation unit.

As is explained below, the layout 34A in FIG. 3A that includes M chunks of size X bytes for each chunk, includes a direct region 36A having N chunks, a shared region 38A having K chunks, and a metadata (MD) region 40A having Z chunks and where:

$$M=N+K+Z \qquad (2)$$

The size of the vLUN 30 as exposed to the application 20 (and file system 24 and LVM 36) is N*X bytes (where X is the size of the chunk in bytes). The shared region 38A, having a size of K chunks of X bytes each, is never exposed to the application 20, file system 24, or LVM 36. The M chunks are the total number of chunks that are mapped to the mapped LUN 52.

As an example, consider a mapped LUN 52 having a size of 166 GB and used to provide a vLUN 30 of size 110 GB (i.e., N*X=110 GB). In addition, in this example, assume that K*X=(N*X)/2=55 GB. Thus, per equation (2) above, the size of the metadata region is 1 GB. Assume that the chunk size X is a nonzero integer multiple of the size of the data storage extent, and assume that this nonzero integer multiple is one (1). Assume that the size of data storage extents is 16 KB (i.e., X=16 KB). Thus, the mapped LUN 52 includes 10,878,976 chunks (M=10,878,976), each chunk having size 16 KB. Those of skill in the art can similarly convert the direct region 36A, shared region 38A and MD region 40A to chunks.

The vLUN 30 provides a total of N logical chunks (e.g., from 0 to N−1), addressed by logical chunk address (LCA). To every layer above the vLUN 30, the LCA looks like any other address. As is explained herein and as is illustrated in FIGS. 3A and 4A, the bitmap (a collection of multiple bits) of the mapping layout 34A has a bit for each LCA in the shared bit table 80A. The direct region 36 has physical chunk addresses (PCAs) that are denoted dPCAs, with the "d" indicating that the chunk addresses are in the direct region 36A. For data stored in the direct region 36A, the LCA is the same as the dPCA; thus, for data stored in the direct region 36A, there is no need for a shared map entry in the metadata regions 40A that shows for an LCA where its shared physical chunk address (sPCA) is. In the layout 34A of the deduplication abstraction layer 32, in the deduplication block layer 28, the vLUN 30 is used to present to applications 20 a logical storage area having a size of N chunks. The deduplication block layer 28 uses the layout 34A of the deduplication abstraction/mapping layer 32 and the metadata stored in region 40A to map the LCA to the location where the data is stored, which can be in either the direct or shared region, depending on the setting of shared bit 80A. For a particular LCA, the shared bit 80A can have a value of zero (not shared) or one (shared). When the shared bit 80A is set to one, there's a corresponding entry in the shared map 82A showing the corresponding shared physical chunk address (sPCA) location for that LCA. In one embodiment, the shared bit 80A is a shared bit table, where there is a bit for each logical chunk address (LCA), and a map entry (in the shared bit map 82A) for each LCA that is shared. In addition, one of skill in the art will appreciate that, in further embodiments, the functions of the shared bit 80A can be implemented using any arrangement capable of indicating whether or not there is a corresponding entry in the shared map that shares a corresponding sPCA.

The layout 34A of the deduplication abstraction layer 32 further defines a shared region 38A for storing shared chunks, where the shared chunks 38A are in use only after deduplication processing detects that one or more chunks are duplicates of each other (i.e., the shared chunks 38A exist, but, because of the thin provisioning 54, are not yet allocated, so no physical space is yet used for the shared chunks until deduplication has occurred and has found at least one pair of chunks having the same digest and the same data). The applications 20 are not aware of the existence of the K chunks in shared region 38A. Rather, the applications 20 only can access data by LCA (that is, the direct region 36A). The deduplication block layer 28 does a mapping to the correct location. For example, an application 20 asks to access a given LCA of vLUN 30. The I/O filter driver 72 (FIG. 2) maps that application 20's request to the appropriate PCA within mapped LUN 52. If the chunk is not shared, then the PCA (dPCA) for that chunk is the same as the LCA. If the chunk is shared, as indicated by the shared bit 80A being set in the metadata 40A (FIG. 4A), then the shared map 82A tells the layer 28 which PCA (sPCA) to use to access the data. Whether the LCA is shared or not is denoted by its bit in the Bit Table (80A). One job of the deduplication block layer 28 is to translate the I/O request from above it into the correct location(s) and pass this down the I/O stack.

The physical addresses within the mapped LUN 52 for these shared chunks in the deduplication block device (sPCA) go from chunk N to chunk (N+K)−1, where K<M, as well. (Note that the layout 34A is a logical representation, not a physical representation, and the shared region 38A need not be physically adjacent to the direct region 36A). Further, in one embodiment, K<N<M. Advantageously, in practice, K generally is less than N (i.e., the shared region 38A is smaller than the direct region 36A). For example, in one embodiment, there can never be more shared chunks in use than N/2, where N is the number of chunks presented by vLUN 30. This is because the data stored in the shared region 38A must fit into the range of the LCA address space (0 to N−1). If every chunk in that address space has exactly one duplicate, the shared region will be filled at size N/2; thus, in one preferred embodiment of the invention, the size of the shared region 38A is N/2. This size is not limiting on the embodiments of the invention, however. The shared region 38A can have other sizes, including sizes smaller than N/2. However, if the shared region 38A is smaller than N/2, it is possible to have duplicated chunks that can't be shared.

After deduplication processing has occurred, the shared region 38A, in one embodiment, is configured in accordance with a data structure (which can be stored in the metadata region 40A on the mapped LUN 52). The metadata region 40A for the implementation of the vLUN 30 having the layout 34A includes, in one embodiment, an array indexed by LCA that contains an entry of a predetermined size for the physical chunk address (PCA) (the PCA is the actual location of the data, and the entry points to the location within the shared region 38A of the mapped LUN 52 where the data for that particular LCA actually is stored). Other types of data structures besides arrays are, of course, usable. The size needed to store the PCA in the metadata 40A is dependant on the number of chunks in the shared region, where the PCA itself only needs to be big enough to address all the chunks in the shared region 38A (i.e., K chunks). In the metadata 40A, each shared map entry 82A contains a PCA. For each LCA, there's a bit, and possibly a shared map entry 82A for each LCA (if they are all duplicated). In one embodiment, the size of the entry for the PCA is 64 bits (8 bytes), but this is not limiting. Each chunk in the shared map 82A contains a predetermined number of entries. In one embodiment, the predetermined number is dependent on the size of the chunk itself and the size of the entry, but this is not limiting. For example, for a chunk size of 8 KB and an entry size of 64 bits, there would be 1024 map entries for each chunk (these exemplary values are not, of course, limiting). As one of skill in the art will appreciate, the information in the metadata 40A/40B (i.e., the content), as well as how it is stored and looked up, can be conveyed in many different ways. For example, in one embodiment, instead of using physical chunk addresses, the metadata could instead provide information in the form of offsets.

Referring again to the layout 34A of FIGS. 1A, 3A, and 4A, the layout 34A also includes a metadata (MD) region 40A, having a size of Z chunks. In one embodiment, Z<<K and Z<<N, but these conditions are not limiting to all embodiments. The metadata 40A has a size that is sufficient to hold all the metadata needed for vLUN 30, using the layout 34A. Advantageously, in one embodiment, the size Z will be a small percentage of the size K of the shared region, but this is not limiting. Referring to FIG. 4A, the MD 40A consists of three parts. The first part includes a shared bit 80A for each chunk in the vLUN 30 presented to users (e.g., applications 20), where the shared bit 80A is set if the chunk is shared. The second part includes a shared map 82A, where the shared map 82A has an entry for each shared chunk that points to where it actually is stored. There is a shared bit 80A for every logical chunk, but there may be a shared map for only the shared logical chunks. For example, if the shared map 82A is stored as an entry in an array, then there could be an entry for every logical chunk, and the ones that are not shared would not be used, such that the PCA would be set to NULL. Note also that it is not required for all the shared bits to be physically placed together. Advantageously, in one embodiment, the shared map 82A portion of the metadata 40A is always loaded in memory 15 or other fast media (i.e., always available and stored in the deduplication block layer 28); this helps to improve the efficiency of reads and writes by applications 20. In one embodiment, the shared bits 80A can be physically placed together, in a tightly packed area, to further help improve efficiency during reads and writes (as will be discussed further herein), but the shared bits 80A are not required to be physically proximate to the other parts of the metadata 40A.

The third part of the MD 40A includes a digest 84A, where the digest 84A is a simple byte array, indexed by sPCA, of unique identifiers (e.g., fingerprint or hash of each share chunk) for a chunk of data. The deduplication engine 44 uses the digest 84A to help locate potential matches to a given chunk and to find shared chunks that have previously been deduplicated. In one embodiment, the digest 84A includes only digests of shared chunks. In one embodiment, the digest 84A includes not only digests of shared chunks, but also digests of direct chunks that are in the process of being checked during deduplication (e.g., to be compared to other direct chunks, as is described later in connection with process of FIG. 8).

In one embodiment, the shared bit 80A is configured using a data structure indexed by LCA and containing a bit, such as:

$$\text{SharedBitMap}[LCA].\text{bit} \qquad (3)$$

where if the shared bit 80A is on, the associated LCA is associated with data stored in the shared region 38A; else, the associated LCA is associated with data stored in the direct region 36A.

In a further embodiment, the shared map 82A is configured using a data structure indexed by LCA and containing a PCA such as:

$$\text{SharedMap}[LCA].\text{PCA} \qquad (4)$$

where the SharedMap[J] (shared map for a given address J) is valid only when SharedBitMap[J]==1, J={0 . . . N−1} (i.e., if the SharedBitMap bit for a given address J is equal to one (the shared bit 80A is set to one) and the address J is between 0 and N−1.

Referring again to FIG. 4A, in one embodiment, the digest 84A is a byte array to identifiers for a chunk of data. The digest data is computed/derived (e.g., by using the aforementioned hash algorithms) from the data in the chunk.

Figure 9:
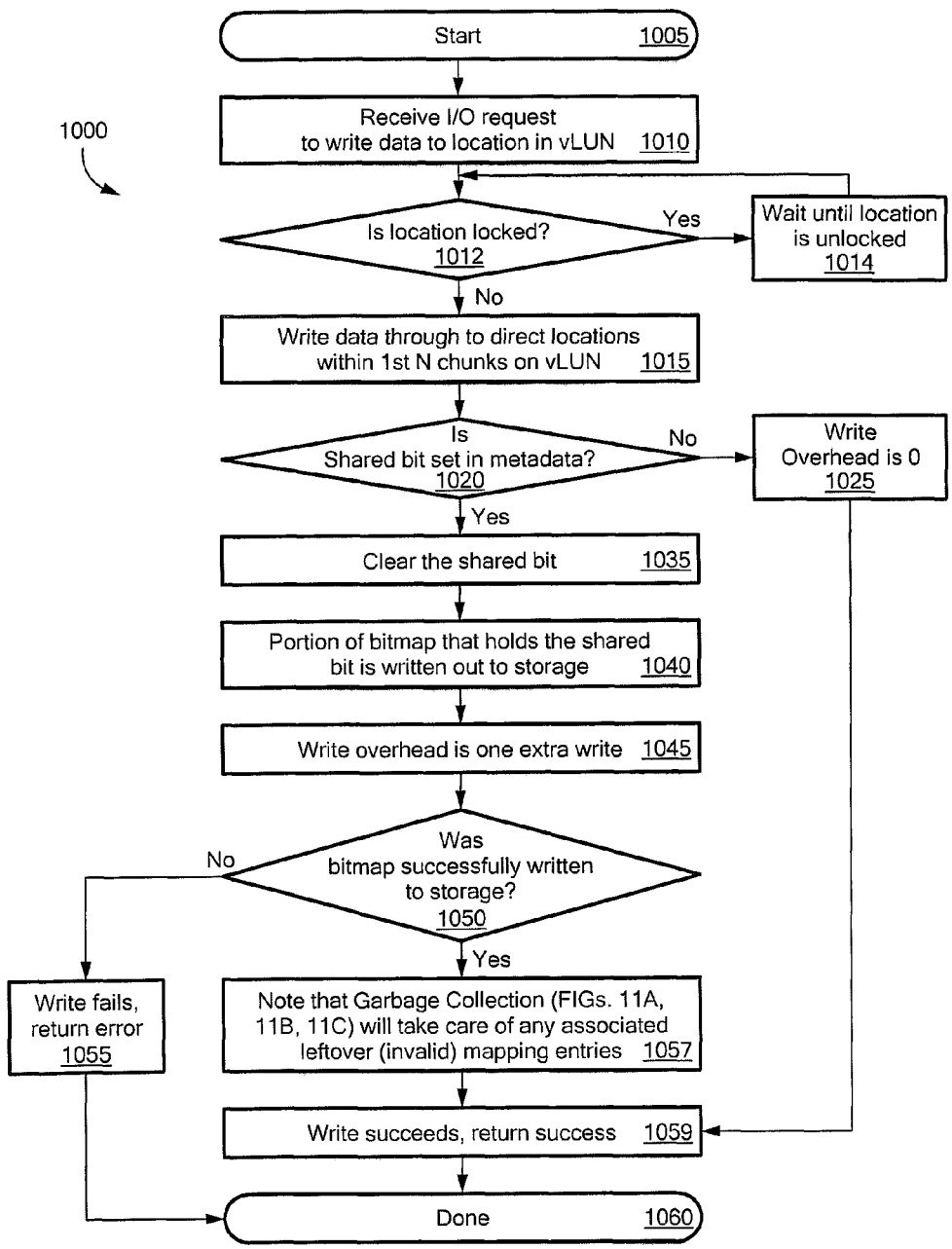
FIG. 9 is a flow chart illustrating a method for writing data, in accordance with one embodiment of the invention.
Figure 10:
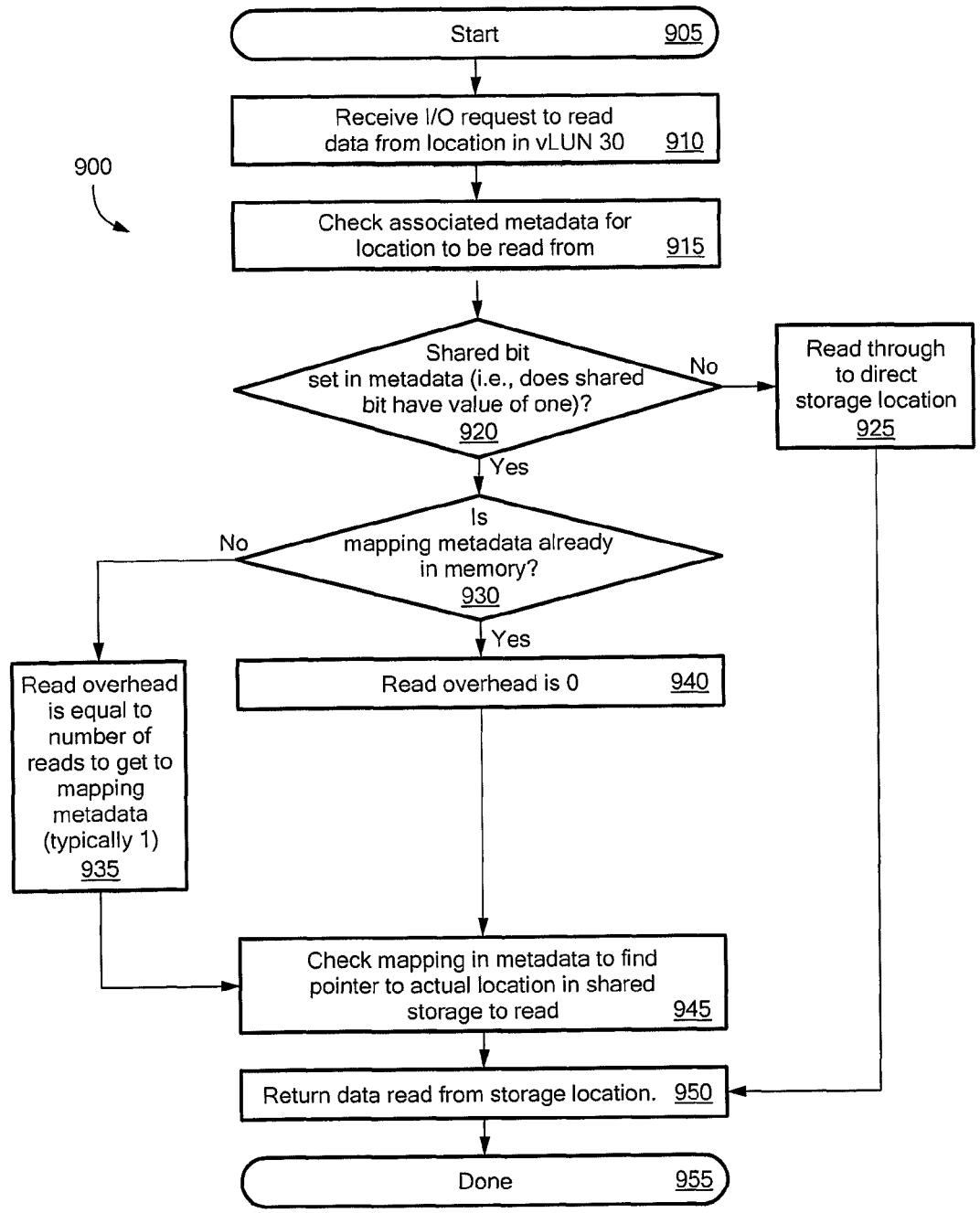
FIG. 10 is a flow chart of a method for reading data, in accordance with one embodiment of the invention.

The above-described mapping arrangement shown in the layout 34A of FIGS. 3A and 4A, which is applied by the deduplication block layer 28 of FIG. 1A, provides advantages to processes such as the write and read methods of FIGS. 9 and 10, respectively. This mapping arrangement 34A keeps the direct region 36A, as a "pure" direct region 36 (i.e., by "pure," it is meant that the I/O filter driver 72 (FIG. 2), which manages the deduplication block layer 28, can efficiently map reads and writes to the correct location in the direct region 36A.) Thus, from the perspective of the I/O filter driver 72, use of the inventive mapping layout 34A and write and read methods described herein can help to reduce overhead for reads and writes done after deduplication, as described further below.

With the inventive mapping layout 34A, and write method (FIGS. 3, 4, and 9) described herein, any writes from an application 20 always go into the direct region 36 of N chunks, by way of the I/O filter driver 72, without having to check a map to locate unused free space and without having to specifically allocate any other free location in which the write is to be stored, as might be required to be done in other deduplication arrangements. Similarly, with the inventive mapping layout 34A and read method (FIGS. 3, 4, and 10) described herein, because the bitmap part of the metadata 40A is always available in the block deduplication layer 28 (i.e., shared bit 80A is copied into memory 15 or other fast media and accessed by filter driver 72 when the filter driver handles reads and writes), a read will either have essentially zero overhead (for non-shared chunks) or, for shared chunks, an overhead equal to the cost of reading the mapping metadata for the chunk. In at least one embodiment, if, at least some of the time, the shared map 82A is in memory 15 or fast media, and doesn't have to be read, then the overhead for reading the mapping metadata is less than the added overhead of having to read each pointer to a shared chunk, then further having to read that chunk. Because there are many more entries on a chunk in the shared map 82A, one read of that chunk can be amortized across many data reads.

FIG. 2, which has been referenced already in the above description, is an exemplary software architecture in which at least one embodiment of the invention can be embodied. As FIG. 2 illustrates, user I/O calls 57 to the storage system 66 first go through an I/O subsystem 67 in the kernel space 58, which I/O subsystem includes an I/O filter driver 72. In this embodiment, this I/O path for the I/O calls 57 is separate from the processes that are responsible for deduplication. As is well understood in the art, the kernel space 58 provides abstraction layers for hardware, memory, processors, and input/output (I/O) and makes these tools available to the user space 56 through system calls.

Referring to FIGS. 1A and 2, the I/O filter subsystem 67, includes an I/O filter driver 72, which facilitates the sending of I/O requests from applications 20 running on the computer system 12 to the storage appliance 14. For example, in at least some embodiments, the I/O filter driver 72 queues I/O requests from the computer system 12 directed to storage appliance 14. In addition, in some embodiments, the I/O filter driver 72 implements algorithms to decide which I/O requests to send, how many I/O requests to send, and the speed at which to send I/O requests. The I/O filter driver 72, in some embodiments, keeps a record of I/O requests that are sent to the storage appliance 14 until the I/O request is processed by the storage appliance 14. An exemplary host-based I/O filter subsystem 67 that includes an I/O filter driver 72 is the POWERPATH product, available from EMC Corporation. As shown in FIG. 2, the I/O filter driver 72 has a so-called "C-clamp" structure, including an O/S interface 97 along the top, a set of common API's 98 along the left side, and a host bus interface 99 along the bottom, with a plurality of managers 91, 92, 93, 95 coupled to the C-clamp structure via a plurality of general purpose extensions 89. The managers 91, 92, 93, 95 and extensions 89 help implement some of the functions described herein and help to manage I/O for the deduplication block layer 28 (including any associated vLUNs 30 implemented on mapped LUN 52.)

As is explained further herein, the I/O filter driver 72 is responsible for correctly mapping application I/O calls to/from LCAs to the right PCA for each operation and also is responsible for maintaining the metadata kept on the deduplication block layer 28. In addition, the I/O filter driver 72 provides synchronization methods used by the deduplication and garbage collection processes described further herein. These functions are, in one embodiment, implemented as extensions within the I/O filter driver 72, with each extension managing corresponding layers in the system of FIGS. 1A-1E.

For example, the deduplication I/O block manager 91 manages the deduplication and garbage collection layer 29 (which includes the deduplication block layer 28 and the deduplication engine 33). Similarly, the I/O synchronization manager 92 of FIG. 2 manages the I/O synchronization layer 31, helps synchronize I/O from an application 20 with deduplication operations, and makes sure that the metadata used by each component is kept up-to-date and correct. The deduplication mapping metadata manager 92 manages the deduplication abstraction/mapping layer 32. If the embodiment uses compression (e.g., FIG. 1E), then the I/O filter driver 72 includes a compression mapping metadata manager 95 to manage the compression abstraction/mapping layer 35. The I/O filter driver 72, optionally, may include other I/O filter driver extensions 94 (e.g., extensions that encrypt data, extensions that migrate data, extensions that replicate data, etc.), where these other extensions and managers 94 can be located anywhere (that this, they could be above, below or intermingled with the extensions/managers 91, 92, 93, 95 that embody at least some embodiments of this invention).

Referring again to FIG. 2, a deduplication daemon 68 runs in user space 56, where the deduplication daemon 68 includes a deduplication engine 44, a garbage collection module 70, and a deduplication index 71. The deduplication daemon 68 is a process (which can be scheduled and/or run periodically) that keeps an index of hashes and locations (deduplication index 71). In addition, the deduplication daemon 68, via deduplication engine 44, is the component that "finds" which chunks have the same data, and then cooperates with the I/O filter driver 72 to direct the rest of the system 10A to actually share the chunks. The deduplication engine 44 performs deduplication. The garbage collection module 70 runs an algorithm to clean up leftover state from a successful or unsuccessful write and also cleans up other states that can arise in the functioning of the system 10A (garbage collection is explained more fully herein). In at least some embodiments of the invention, it is more advantageous to use a lower-priority "outside" process like garbage collection 70 to do such cleanup than having this cleanup done during the course of processing application I/O's, because the outside process of garbage collection, as described herein, has less impact on applications 20 that are running.

Referring again to FIG. 2, the index 71 is a data structure that stores the digests, which each contain location mapping, as described herein. The I/O filter driver 72, via its deduplication I/O block manager 92, I/O synchronization manager 92, and mapping metadata managers 93 (and, optionally, 95), is the interface that the deduplication daemon 68 uses to make calls to the storage appliance 14 in the storage subsystem 62 that are necessary for deduplication and/or compression.

As further illustrated in FIG. 2, in one embodiment of the invention, a compression daemon 61 runs in user space 56, where the compression daemon 61 includes a compression engine 45, a set of compression algorithms 63, and a compression module 65. The compression daemon 61, via its compression engine 45, is the component that locates data that are suitable for compression, then uses an algorithm selected from the set of compression algorithms 63 to compress the data, and then cooperates with the I/O filter driver to direct the rest of the system 10 (which could, in this example embodiment, be the system 10E of FIG. 1E) to location of the compressed blocks.

In accordance with one embodiment of the invention, when the I/O filter driver 72 is doing a write, the I/O filter driver does the write, then ensures that the shared bit 80A is cleared (e.g., by clearing it, if necessary), because, in this embodiment, writes are always done to the direct region 36A, so the shared bit 80A is not set. The process for doing writes in this embodiment is explained more fully herein in connection with the FIG. 9, which is a method for writing data in accordance with one embodiment of the invention. When the I/O filter driver 72 is doing a read, the I/O filter driver needs to look at the shared bit 80A to see if it is set (e.g., is set to one or is set to be "on"). If the shared bit 80A is set, then the I/O filter driver 72 uses the share map 82A to find the correct LCA for the location being read by the application 20. The I/O filter driver then redirects the read to that location.

Figure 5:
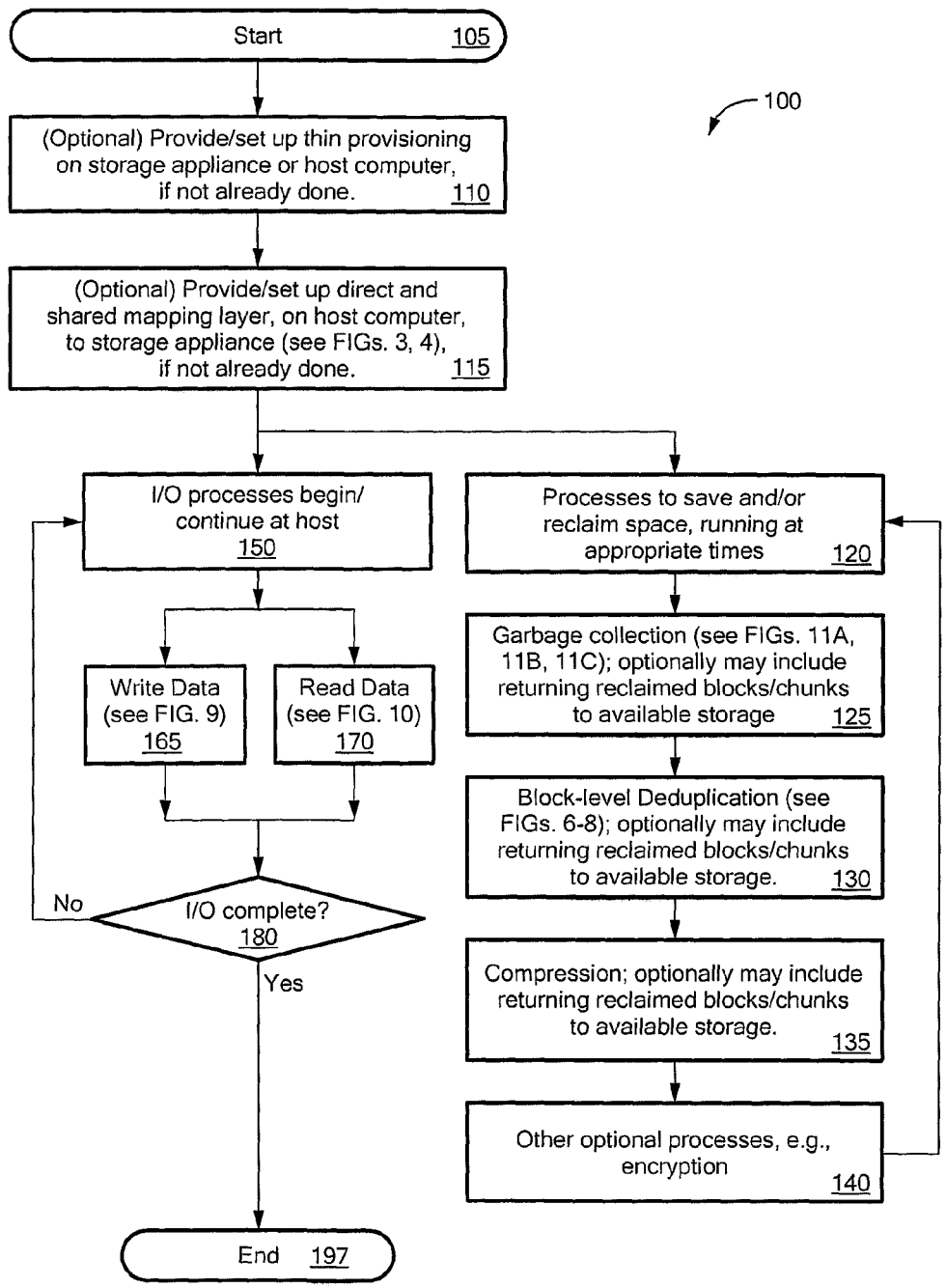
FIG. 5 is a high-level flow chart showing processes that can occur in the systems of FIGS. 1A-1E and the software architecture of FIG. 2, in accordance with one embodiment of the invention.

FIG. 5 is a high-level flow chart 100 showing processes that can occur in the system 10A of FIG. 1A and in the software architecture of FIG. 2, in accordance with one embodiment of the invention. This flow chart describes at a high level the various processes that occur in the system 10A of FIG. 1; the particular details relating to the processes are detailed further herein in FIGS. 6-11B. Referring to FIGS. 1A, 2, 3A, and 4A, at block 110, thin provisioning is configured on either the storage appliance 14 or the host computer 12 or network switch 19 (depending on whether the embodiment corresponds to FIGS. 1A, 1C, 1D, 1E or FIG. 1B), if this has not already been done. In addition, if not already done, the direct and shared mapping shown in the map 34 of the deduplication abstraction layer 32 also is established for the given vLUN 30 (or vLUNs 30, as there can be more than one vLUN 30). Once the thin provisioning and mapping are established, the I/O processes (block 150) occurring between the host computer 12 and the storage appliance 14 take place in accordance with the inventive processes described herein. As the flowchart 100 of FIG. 5 shows, the I/O processes (i.e., read, write) can take place substantially in parallel with the processes (deduplication, garbage collection, compression) that, beginning with block 120, and are run to save and/or reclaim space (which are referred to herein, as "space reclamation processes", "space saving processes", "data reduction processes," and/or "storage reduction processes") (block 120). By "parallel" it is not implied that the I/O processes must occur substantially simultaneously with the space reclamation processes (although reads and writes certainly can occur in parallel), although, for at least some embodiments that is possible. As explained below, the I/O processes and space saving processes can occur in a manner such that one of the processes does not occur until the other one is complete. Advantageously, in one embodiment, the space saving processes run on the same host computer 12 as the application 20 that is using the vLUN 30, but this is not required.

In one embodiment, the space-saving processes of FIG. 5 also use the allocation and deallocation features exported by the thin provisioning layer 54 that is implemented using the mapped LUN 52, as is described herein. The application 20 that is using the logical unit undergoing a space saving process could be running on a different host 12 than the space saving process itself, although the actual process that moves the data and reclaims space has to be synchronized with I/O on the host 12 where the application 20 is running. For example, deduplication (block 130) can run almost anywhere, e.g., on a different host 12, so long as the deduplication has access to sufficient space to store the deduplication index 71 (FIG. 2) and to interfaces that allow deduplication to get the hashes for the blocks, drive the block sharing, and mark blocks as being shared.

Advantageously, one or more of the space reclamation processes of FIG. 5 (e.g., deduplication, garbage collection, compression) are configured to run at appropriate times in the system 10, so as not to interfere with the performance of I/O functions of application 20. For example, in one embodiment, one or more of the space reclamation processes are configured to run in the background (i.e., "out of band" or "asynchronously"), such that the space reclamation processes are not occurring at substantially the same time as I/O processes, but instead either between, before, or after I/O processes (e.g., during "off hours", when a given I/O process is complete, and/or before the next I/O process begins). In another embodiment, the one or more of the space reclamation processes that are running are configured to run at predetermined times, such as at predetermined intervals (advantageously, these intervals are timed so as occur during times of low to no levels of I/O). In a still further embodiment, one or more of the space reclamation processes are configured to run as I/O processes occur (e.g., "in band" or "in line"); for example, the deduplication (block 125) would be run as data is being written (block 165).

Referring again to FIG. 5, in the I/O process path (blocks 150 through 180), the I/O processes begin (or continue, if they already have been started and/or are in process), including processes such as writing data (block 165), which is explained more fully in FIG. 9, and reading data (block 170), which is explained more fully in FIG. 10. The I/O processes continue until complete (block 180).

Figure 6A:
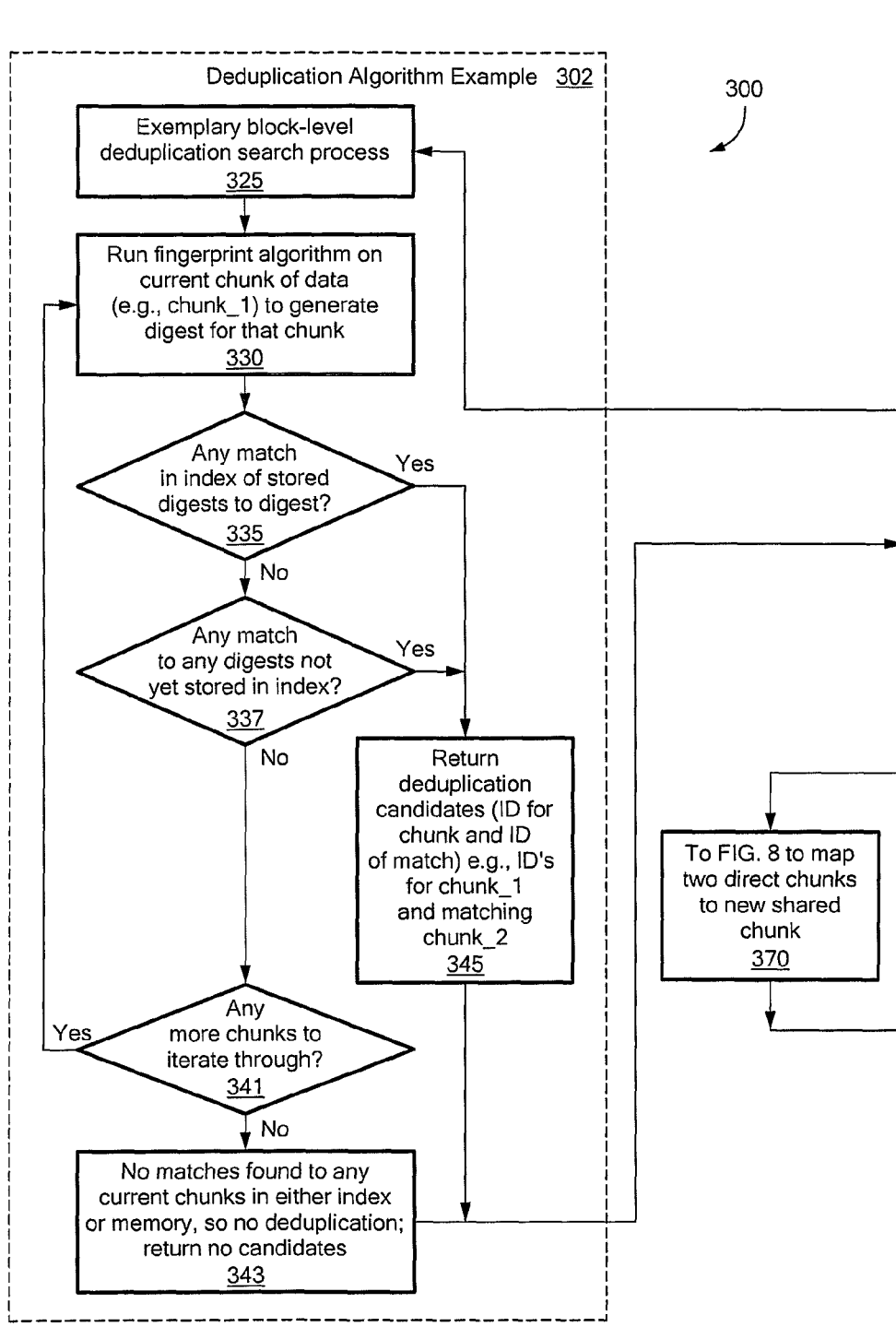
FIGS. 6A-6B are flowcharts showing a method for a deduplication process, in accordance with one embodiment of the invention.
Figure 6B:
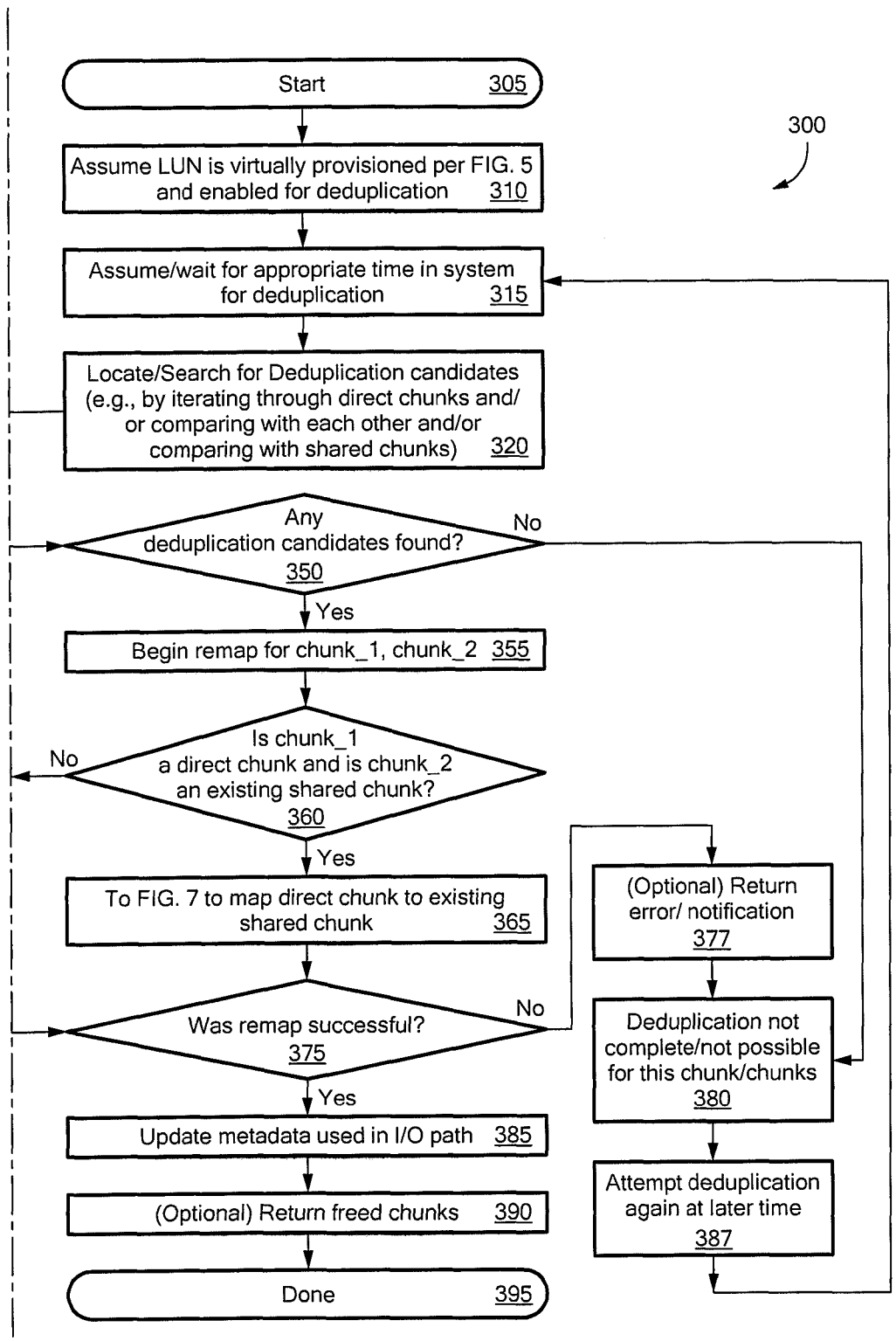
Figure 7:
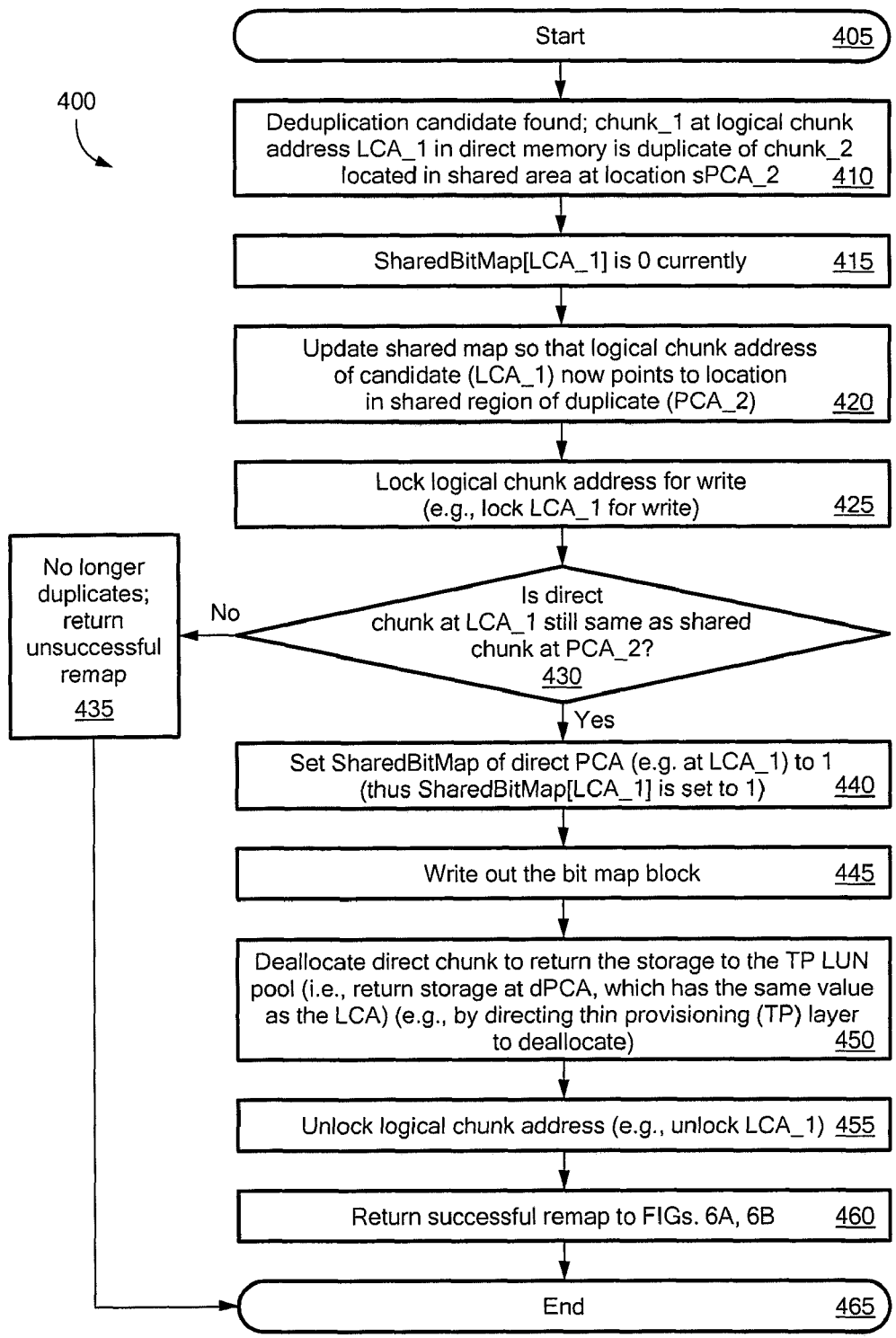
FIG. 7 is a flowchart showing a method of mapping a direct chunk to a shared chunk, in connection with the deduplication process of FIGS. 6A-6B, in accordance with one embodiment of the invention.
Figure 8:
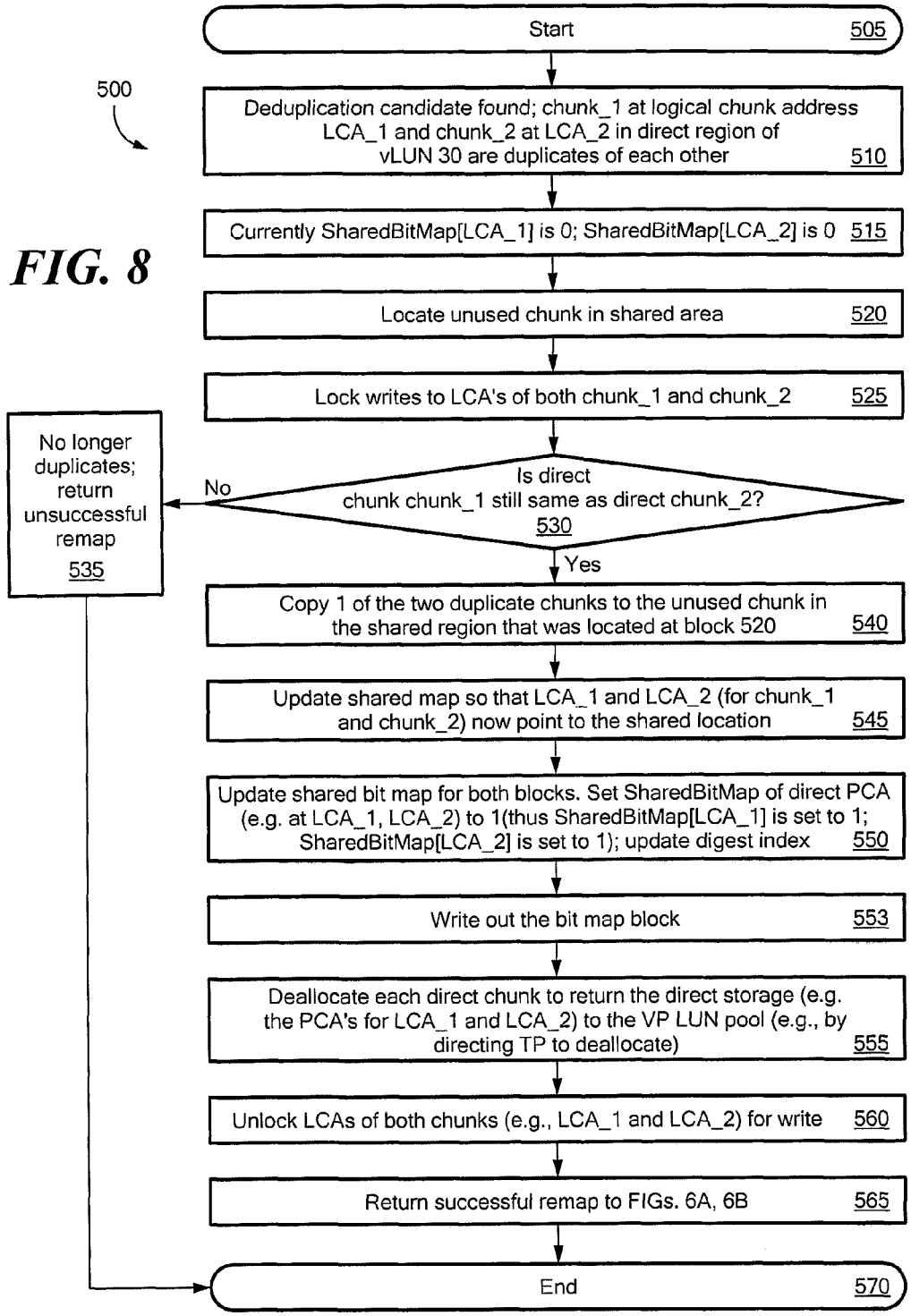
FIG. 8 is a flowchart showing a method of mapping two direct chunks to a previously unused chunk in the shared region, in connection with the deduplication process of FIGS. 6A-6B, in accordance with one embodiment of the invention.
Figure 11A:
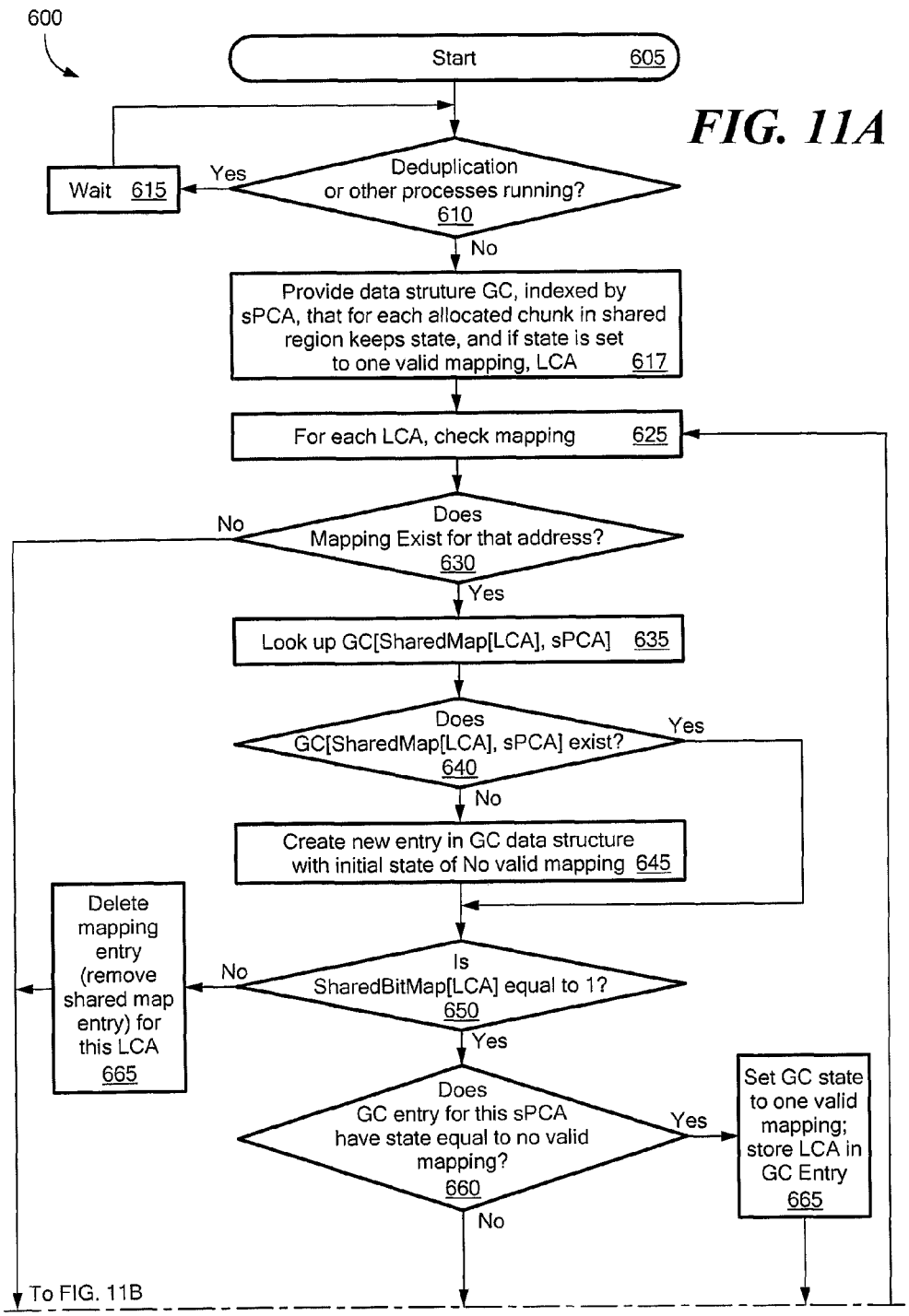
FIG. 11A is first part of a flow chart of a method for garbage collection, in accordance with one embodiment the invention.
Figure 11B:
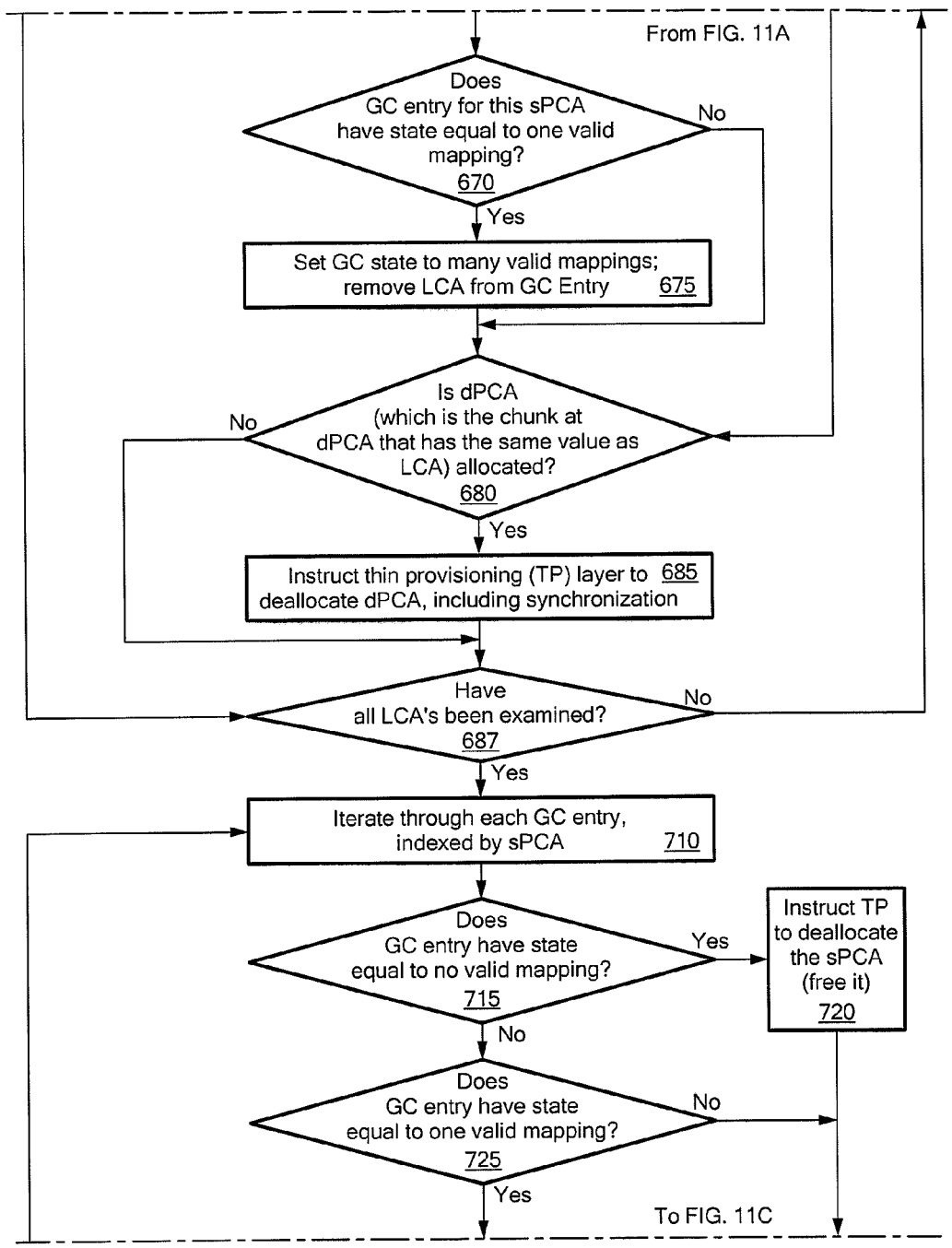
FIG. 11B is a second part of the flowchart of FIG. 11A, in accordance with one embodiment of the invention.
Figure 11C:
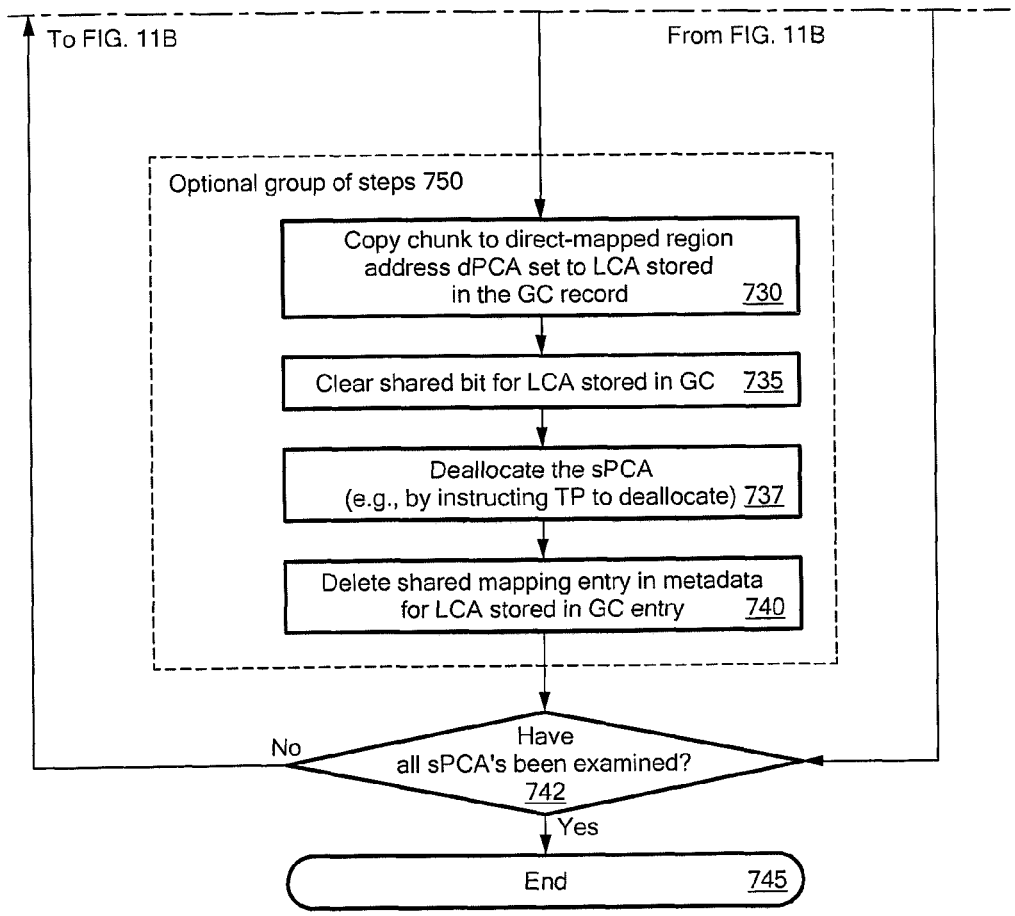
FIG. 11C is a third part of the flow chart of FIG. 11A, in accordance with one embodiment of the invention.

The space saving processes (block 120) include block-level deduplication (block 130), described further in connection with FIGS. 6-8; compression (already well understood in the art and discussed briefly herein) and garbage collection (block 125), described more fully in connection with FIGS. 11A-11C. The space saving processes beginning at block 120 can be running in-band, at scheduled times, or upon the occurrence of a specific condition. The space saving processes beginning at block 120 can provide notification that certain space is no longer needed, and, in one embodiment, the reclamation of the space (i.e., "returning reclaimed blocks/chunks to available storage") can be implemented as part of any one or more of the space saving processes, as FIG. 5 illustrates, or can be done by a background process, or can be done by some separate process. Thus, it should be understand that, depending on the embodiment of the invention, returning the reclaimed space to available storage can occur in many different places, including after all space saving processes are complete and/or after I/O is complete (block 180). In addition, in certain embodiments of the invention, thin provisioning (or the alternate mapped LUN 52', or allocate/deallocate processes known to those of skill in the art) is used to accomplish the returning/reclaiming of storage space.

Referring again briefly to FIG. 5, garbage collection, is a process that helps to "clean up" leftover state from a successful or unsuccessful write, e.g., cleaning up after a crash (e.g., an unsuccessful write), and moving a chunk back to the direct region 36A, if it is no longer shared (e.g., after a successful write). In one embodiment, it is preferred that deduplication (block 130) and garbage collection (block 125) not run at the same time. For example, in one embodiment, garbage collection and deduplication are separate processes, and run one after the other, where either garbage collection or deduplication can be first. Advantageously, in one embodiment, it is preferred to run garbage collection (block 125) prior to deduplication (block 130), as is shown in FIG. 5, because this order has the potential to reclaim more space than if the order is reversed. In a further embodiment (not shown in FIG. 5, but well understood by those of skill in the art when viewed in connection with FIG. 5), garbage collection and deduplication can be run at the same time (i.e., in parallel), but still as separate processes.

As will be explained further herein, if the deduplication process discovers that shared chunks exist, the deduplication process adds information to the shared map 82A and effectively moves chunks to the shared region 38A. Garbage collection removes information from the shared map 82A and, in some instances, may move some shared chunks back to the direct region 36A.

Another space saving process usable in at least some embodiments of the invention is compression, which helps to reduce the size of stored data, by working within a chunk or set of chunks of stored data to identify and remove empty space that appears as repetitive patterns. Compression thus can sometimes be viewed as a form of data deduplication, but the deduplication is local to the chunk itself, and is not used to recognize and eliminate duplicate chunks, although compression can independently compress each of the chunks. In addition, in at least some embodiments of the invention, the compression is done at the block level, where it looks for repetitive patterns within a block. In the example embodiment of FIG. 1E, the system 10E includes a data reduction engine 46, which includes both a deduplication and garbage collection engine 44 and a compression engine 45, indicating that both space saving processes are being run. In alternate embodiments, the data reduction engine 46 implements one or the other of data reduction and compression, but not both.

FIG. 3B is an illustration of a compression mapping layout for information stored on a virtual logic unit, for the computer system of FIG. 1E, in accordance with one embodiment of the invention, and FIG. 4A is an illustration showing in greater detail the metadata portion of the mapping layout of FIG. 3A. Referring briefly to FIGS. 1E, 3B, and 4B, for embodiments of the invention that use data compression as one of the space saving and reclamation features (also referred to herein as data reduction features), the mapping is as follows: The vLUN 30 is mapped with the layout 34B, where the mapped LUN 52 has a total of L chunks, including a total of U uncompressed chunks of data in the uncompressed region 36B, a total of C compressed chunks in the compressed region 36B, and a metadata region of Y chunks. The vLUN 30 only exposes U virtual chunks, which may be either compressed or uncompressed when stored on the mapped LUN 52. The compressed bit map 80B (also referred to herein as compressed state indicator) tells whether or not a chunk is compressed, where the bit is clear if it is not compressed, and set it is compressed, similar to the shared bit 80A indicating whether or not a chunk is shared with deduplication. The compressed metadata map 82B tells where the compressed chunk can be found. Note that when a chunk is compressed, it no longer consumes actual storage in the uncompressed region 36B, but consumes a smaller amount of storage in the compressed region 38B.

In a further embodiment, referring to FIGS. 2 and 3B, compression runs in kernel space 58, not user space 56, and the mapping of FIG. 3B is not required. In this embodiment, two versions of the address space accessible to layers above the vLUN 30 (e.g., applications 20) are created. These versions of the address space are regions, each containing a range of addresses, where one region is an uncompressed address space, and the other region is a compressed address space. Advantageously, in one embodiment, the uncompressed region and the compressed region can be adjacent address space regions, for example of a similar or identical size, where each address in the compressed space is a consistent offset (e.g., the offset can be equivalent to the size of the address space, e.g., 16 TB) from a corresponding address in the uncompressed space. Thus, the high bit of an address can indicate that an address is compressed. This also provides advantages and reduced overhead during reads and writes of compressed data. For example, if an application 20 is writing data, and the data is compressible, the compression daemon 61 compresses data in the background, moving the data from the uncompressed space to the compressed space. (Thus, the mapping associated with this embodiment is implicit, not explicit.). If the data is not compressible, the I/O filter driver 72 writes the data to the uncompressed address space. If an application 20 is reading data, and it has an address for the data, e.g., 0010, the I/O filter driver 72 working with the application 20 first looks in the uncompressed space at address 0010. If that location is empty, then the I/O filter driver 72 adds the offset to the address, and looks in the compressed address space at an address of 0010 plus the offset.

The compression algorithm used can be any known compression algorithm (e.g., Lempel-Ziv (LZ), Huffman, etc.). In one embodiment, as noted previously, the compression algorithm works on a multiple of chunks. For example, referring to FIGS. 1E, 3B, and 4B, in one embodiment, the allocation unit size on the mapped LUN 52 having thin provisioning layer 54 is 8 KB, and the compression engine 45 is configured to work on a chunk having a size of 32 KB (i.e., a chunk size that is a multiple of 4 times the allocation unit size). Note that this multiple of four is exemplary and not limiting. In this example, a 32 KB compression candidate is compressed, for example, into a 24 KB chunk (i.e., is compressed into a chunk that is another multiple of the allocation unit size, in this case three (3) times its size) and is stored in the compressed region 38B. This compression thus allows four (4) 8 KB chunks (i.e., 32 KB—the size of the chunk that the compression engine works on) in the direct region 36B to be returned to the thin provision pool 60, with only three chunks being allocated in the compressed region 38B to store the data that originally required four chunks. In one embodiment, the compressed region may be block addressed and not chunk addressed (e.g., where a block is 512 bytes, but this is not limiting). The compression metadata map 82B provides information that includes any one or more of information indicating where a compressed chunk is stored, (i.e., the physical location or offset), the size of the compressed chunk (e.g., its length), and the type or format of compression used to compress the chunk. For example, in one embodiment, the compressed metadata map 82B includes a pointer to the beginning of the compressed chunk, the algorithm used to compress it, and the size of the compressed data (so that the compressed chunk can be decompressed when needed). Unlike with deduplication, compression does not require a digest 84A.

Referring again to FIGS. 3A, 3B, 4A, 4B, and 5, prior to storing data to the storage appliance 14, when the space saving processes are complete, other optional processes, such as encryption (block 140) can be applied to the data. Although not shown in FIG. 5, those of skill in the art will appreciate that data synchronization is, of course, part of each of the space saving processes. Data Synchronization is a function known in the art and generally involves keeping multiple copies of data coherent with one another. Data synchronization, in at least one embodiment of the invention, is necessary if chunk data is moved from the shared region 38A to the direct region 36A. How this occurs is described later herein, during the discussion of garbage collection. If a chunk is being moved from the shared region 38A to its PCA in the direct region 36A, while the movement is being done, application 20 I/O that might write new data to that PCA (which is equal to the LCA that the application 20 is writing to) in the direct region 36A must be held off, until the move is complete. Similarly, if a chunk with a particular LCA is identified by the deduplication process to be moved to the shared region 38A, application 20 I/O that might write new data to that LCA must be held off until the move is complete. Examples similar to this are discussed further herein in connection with FIGS. 7 and 8. In one embodiment, data synchronization also inherently occurs during garbage collection (FIGS. 11A-11C, described further herein).

If Garbage Collection (block 125) and deduplication (block 130) are running at the same time, then there needs to be synchronization between these two processes, as well. In the case of garbage collection and I/O processes (potentially running at the same time), synchronization helps ensure that garbage collection and the I/O processes are not both writing to the same chunk in the direct region 36A at the same time. Thus, with synchronization, when the garbage collection process wants to deallocate an unused chunk in the direct region 36A, the synchronization must prevent the I/O processes from writing to that location being deallocated. Similarly, when the deduplication process is moving a chunk to the shared region 38A, synchronization must prevent the I/O processes from writing to the chunk or chunks being moved. As is well understood, synchronization consists of steps to lock out writes to certain regions and then to unlock this lock when the lock out is no longer necessary.

FIGS. 6A-6B are a flowchart showing a method 300 for a deduplication process, in accordance with one embodiment of the invention. In this example, it is assumed that deduplication is running in some predetermined manner (for example, either at predetermined times or when a set of predetermined conditions exist in the system 10, such as between writes and reads, after all I/O is complete, low I/O times, when other processes like garbage collection are not running, as data is written, etc.). Those of skill in the art will recognize that the method of FIGS. 6A-6B can easily be adapted for running in an "on demand" manner at any desired time, by command or instruction received from some external entity, process, or user. Advantageously, the deduplication process of FIGS. 6A-6B runs in user space 56 (FIG. 2), but this is not limiting.

Referring to FIGS. 1A, 2, and 6A, and 6B in the method 300 of FIGS. 6A-6B, the deduplication process is automatically set up to start (block 305) assuming certain conditions are met. These conditions can, of course, vary in the different embodiments of the invention, and not all conditions are required in all embodiments. One condition associated with one embodiment is that the LUN associated with the deduplication block layer 28 be virtually provisioned (as described herein) and that the LUN has been enabled for deduplication (block 310). Another condition for another embodiment is that it should be an appropriate time in the overall system processing (FIG. 5) for deduplication (block 315). Depending on whether the deduplication of the embodiment is in-band or out-of-band, for example, an appropriate time could be, e.g., at a predetermined time (e.g., for out-of-band deduplication), or could be when levels of I/O are low and/or are not occurring, or could be in between I/O calls (e.g., after a write and before a read, and vice-versa).

Another condition for it being an appropriate time for deduplication, in certain embodiments, is that certain other system processes, such as garbage collection and/or compression, are not occurring at the same time as deduplication. A still further condition for it being an appropriate time in the system for deduplication is that the LUN actually be available and not offline. Another condition for deduplication in some embodiments is that the shared region 38 not be full, although in most embodiments, this is unlikely, because the shared region 38 is large enough to hold every duplicated chunk. Consider an embodiment where there are N chunks and each is duplicated exactly once. Then the space needed for the shared region is N/2 chunks. If any of the N chunks is duplicated even more than once, there is even more savings. Those of skill in the art will appreciate that the method 300 optionally could include additional steps checking whether any conditions required for deduplication are met, where the steps include waiting and/or returning an error or notification if the conditions for deduplication are not yet met and/or cannot be met.

Referring again to FIGS. 1A and 6, assuming that the conditions of blocks 310 and 315 are met, a deduplication algorithm 302 is executed on the chunks in the thinly provisioned mapped LUN 52 by iterating through the chunks (block 320) to search for deduplication candidates. During the iteration, the direct chunks are iterated through and compared either with other direct chunks and/or with shared chunks. As discussed previously, many different deduplication algorithms are usable in connection with the invention, and the deduplication algorithm of block 302 is provided by way of example only. The deduplication algorithm 302 of FIG. 6 runs a block-level deduplication search process (block 325). For each chunk of data being iterated, a digest (which, as is known in the art) such as a string of characters or a number) is generated for each chunk by applying to it a known fingerprint or hashing algorithm, such as MD5, or one of the algorithms in the SHA family (e.g., SHA-1). Of course, many other fingerprint/hashing algorithms are usable. The digest that is created is based at least partially on the content of the chunk. If two chunks are exactly the same, the digest of the chunk that is created by the hashing algorithm also will be the same, so that will enable the detection of duplicate chunks, such as by comparing the digest that was created with other digests stored in an index of stored digests, which in one embodiment of the invention corresponds, e.g., to the deduplication index 71, where the deduplication index 71 is a collection of digests, wherein each digest stores the same type of information as is stored in the digest 84A of the metadata 40A of FIG. 4A.

Referring again to FIG. 6A, during the processing of block 335, the digest of the chunk in the direct region is first compared to the index of stored digests to see if a match is found. If a match is found (block 345), the deduplication candidates are returned. If the hash (e.g., hash algorithm) used is a strong algorithm, that helps reduce the likelihood that there will be multiple digests, each with the same value, but pointing to different data (i.e., a so-called "hash collision"), which can occur if the hash weak. If there is concern about the potential for hash collisions, the deduplication algorithm 302 can be modified to include a double check of the associated data contents for any potential duplicate digest candidates. However, it may be more advantageous in certain circumstances (such as if application I/O is occurring during deduplication) to perform this double-check of data contents during the processing described in FIGS. 7 and 8 (referenced in FIG. 6 and described further herein), because, at that point, the chunks to be shared will be locked for writing. The comparison of data contents is then made after the lock is obtained, because, otherwise the data could have changed after the digest was calculated. If no application I/O is going on while the deduplication process is running, then it might not be required to wait for shared chunks to be locked for writing, although this process of checking the data contents still can be used to check for hash collisions.

If no matches are found and there are more chunks to iterate through, the process beginning at block 330 is repeated until either a match is found, or it is determined that there are no deduplication candidates (block 343). In one embodiment, during the running of the deduplication algorithm 302, digests of the shared chunks of shared region 38A are read from the metadata 40A into the index 71 (FIG. 2) (the index 71 is stored in the memory 15 of the computer/host 12). New digests are calculated for the chunks in the direct region 36A, and these new digests also are stored in index 71 (and are not necessarily stored in the metadata digest 84A) while the deduplication algorithm 302 is processing. This enables locating matches between direct chunks as well as matches between a direct chunk and a shared chunk.

If no deduplication candidates are found after iterating through all possible chunks that could be subject to deduplication (block 350), then the state is that deduplication is not possible for the available chunks at this time (block 380). In the embodiment in the method 300 of FIGS. 6A-6B, the system 10A waits to attempt deduplication again later (block 387), such as at a later predetermined time, by which time additional writes may produce further deduplication candidates.

If deduplication candidates were found (block 350), which by example are referred to here as chunk_1 and chunk_2, then a so-called "atomic remap" process is begun (block 355), where the atomic remap process shares the chunks and frees space found in the duplicate chunks. By "atomic," it is meant that the steps in the operation must all be completed as if they were a single step, or the steps must be backed out as if the operation never started. If the original chunk (first deduplication candidate found, chunk_1) is a chunk in the direct region and the matching chunk (e.g., chunk_2) is an existing shared chunk (block 360), then the method of FIG. 7 is used to map the direct chunk to the existing shared chunk (block 365) (FIG. 7 is discussed further herein). If the answer at block 360 is "NO", then it is assumed that both chunk_1 and chunk_2 are direct chunks, and the method of FIG. 8 is used to map the two direct chunks to a new shared chunk (block 370) (FIG. 8 is discussed further herein.) In one embodiment, it may be possible to discover two existing shared chunks that are duplicates of each other, and these chunks could be remapped, if desired.

After the mapping processes of either FIG. 7 or FIG. 8 have occurred, each process will return an indication as to whether the remap was successful (block 375). If the remap was not successful (block 375), such as if a comparison of the chunks revealed that their digests are not the same and/or that the underlying data does not match (or no longer matches, because, for example, it was written to as the deduplication process was occurring), then, optionally, an error or other notification can be returned (block 377).

If the remap was successful, then the metadata 40A used in the I/O path is updated; that is, the shared bit map 80A is set to reflect that the chunk is now shared, and the shared map 82A is updated with the correct location, so that later read I/O for this chunk will go to that location in the shared region (block 385). At this point, any direct chunks (associated with dPCAs) freed by the remapping optionally can be returned to available storage. In one embodiment, this returning of storage associated with the dPCAs that are no longer needed is done via the thin provisioning layer 54's allocation process, but, in other embodiments of the invention, other techniques for allocation and deallocation are usable (such as the technique using the alternate mapped LUN 52', which is described further below). This optional returning of freed direct chunks at block 390 of FIGS. 6A-6B thus could occur, in the system flow diagram of FIG. 5 as part of blocks 120, 125, and/or 130. As indicated previously, the returning of freed chunks also can happen at other times.

FIG. 7 is a flowchart showing a method 400 of mapping a direct chunk to a shared chunk, in connection with the deduplication process of FIGS. 6A-6B, in accordance with one embodiment of the invention. Referring to FIGS. 1A, 2, 3A, 4A, and 7, when the deduplication process finds, based on a comparison of the digests, that a given direct chunk (chunk_1) is a match to one of the shared chunks (chunk_2) (block 410), then the shared map is updated first (block 420), i.e., before resetting the shared bit. Note that, prior to updating the shared map, the shared bit 80A associated with the direct chunk_1 (at its logical chunk address LCA_1 in the vLUN 30 managed by deduplication block layer 28) has a value of 0, because the chunk initially is not indicated as being shared (block 415). During updating, the shared map 82A is updated so that the map entry for LCA_1 will point now to the physical chunk address location in the shared region of mapped LUN 52 where the data for duplicate chunk_2 resides. Thus, the shared map 82A in the metadata 40A for chunk_1 will now point to PCA_2. (block 420). At this point, however, because the shared bit 80A is still set to zero, no application reads, handled by the deduplication layer 28, would use the shared map 82A to get to the underlying data. Thus, in at least some embodiments of the invention, the updating of the shared map 82A can occur "in bulk" (meaning that it can be done for as many different multiple different pairs of matched chunks as were found during deduplication in FIGS. 6A-6B) and then their respective shared bits 80A can be updated.

Referring again to FIG. 7, when it is time to update the shared bit 80A for the direct chunk_1 for which a match has been found, it is advantageous to prevent any applications from writing to chunk_1. Thus, the logical chunk address of direct chunk_1 is locked for write (e.g., by locking LCA_1 against any writes) (block 425). However, because an application still may have attempted to write to direct chunk_1 before the lock was in place, a comparison is made to confirm that the direct chunk_1 and the duplicate shared chunk_2 are still the same (block 430). Depending on the type of hash used in the implementation, the comparison at block 430 can compare only the hashes (where it is trusted that the hash strength is sufficiently strong) or, alternatively, compare the data stored in the chunk (where the strength of the hash is in question). This also can be used to detect hash collisions. In at least some embodiments, the comparison at block 430 can compare both the hashes and the associated data. Note, however, that if any other logical chunk addresses in the direct region 36A that are mapped to this duplicate shared chunk_2 are written to during the process of FIG. 7, it has no effect on the process for chunk_1.

If the comparison at block 430 fails, then the method 400 will return to the deduplication method 300 of FIGS. 6A-6B an indication/notification that the remap was unsuccessful (block 435). If the comparison at block 430 was successful, then the shared bit map 80A for the logical chunk address of chunk_1 is set to 1, to indicate that the chunk is shared (block 440). To help ensure transactional consistency, in one embodiment, the smallest unit that can be written to disk (e.g., a section of a whole bit map table that is an aligned 512 bytes) is written to mapped LUN 52 (block 445). For a given logical chunk address LCA_1, which for direct chunks is the same as the physical chunk address PCA_1, even if only a single bit in the bitmap block (i.e., the shared bit 80A) is changed (i.e., changed from 0 to 1), the portion of the bitmap that holds the shared bit 80A is written to storage.

Once the bit map block has been written out to disk (block 445), the direct chunk_1 is ready to be freed. The freeing of the chunk can be done at anytime after the shared bit 80A has been set for this LCA. Assuming that the storage associated with chunk_1 is to be freed at this point (and not at some other time, e.g., the other times shown in FIG. 5), the direct chunk_1 is deallocated (i.e., released) (block 450). For example, in one embodiment, the allocation process for the thin provisioning 54 is directed to free the chunk and return it to the storage pool 60 used by the thin provisioning layer 54 (e.g., to return storage at the dPCA, where the dPCA that is returned has the same value as the LCA). The LCA of chunk_1 is then unlocked for writes (block 455), and notification of a successful remap is returned to FIGS. 6A-6B (block 460). It should be understood that other techniques for allocating and deallocating a chunk other than thin provisioning also are usable with the write method of FIG. 7 (as well as the read method of FIG. 8, and the garbage collection method of FIGS. 11A-11C, all discussed further herein), as will be appreciated by those of skill in the art. For example, in one embodiment, the deduplication abstraction/mapping layer 32 provides its own allocation and deallocation method by creating an alternate mapped LUN 52' to the mapped LUN 52 that is provided by the thin provisioning layer 54. This alternate mapped LUN 52', although not shown in FIG. 1A, will be readily understood by those of skill in the art. The alternate mapped LUN 52', which can take the form of a layer similar to the other layers of FIG. 1A, is capable of allocating and freeing chunks as needed. This embodiment with the alternate mapped LUN 52' is more complex than other embodiments that instead are able make use of the already existing mapping and allocation done by the thin provisioning layer 54, because at least some of these other embodiments use a data reduction (e.g., deduplication or compression) chunk size that is a non-zero integer multiple of the thin provisioning allocation unit or storage extent size.

FIG. 8 is a flowchart showing a method 500 of mapping two direct chunks to a previously unused chunk in the shared region, in connection with the deduplication process of FIGS. 6A-6B, in accordance with one embodiment of the invention. Much of the method 500 of FIG. 8 is similar to the corresponding similar blocks in the method 400 of FIG. 7, but in the method 500, the data actually has to be moved or copied to the shared region 38A before it can be shared. Referring to FIGS. 1A, 2, 3A, 4A, and 8, the deduplication process of FIGS. 6A-6B has found, based on a comparison of the digests, that a given direct chunk (chunk_1) is a match to another direct chunk (chunk_2), where both chunk_1 and chunk_2 have LCA's in the direct region 36A of vLUN 30 and are stored in direct region of mapped LUN 52 (block 510) (note that the chunk_2 in the example of FIG. 8 is another direct chunk, whereas the chunk_2 in the example of FIG. 7 is a shared chunk). Prior to updating the shared maps for chunk_1 and chunk_2, the shared bit 80A associated with each direct chunk (e.g., at LCA_1 and LCA_2, respectively, in the vLUN 30 managed by deduplication block layer 28), has a value of 0, because neither chunk_1 nor chunk_2 initially is indicated as being shared (block 515).

When it is time to update the shared bit 80A for direct chunk_1 and direct chunk_2, which are duplicates of each other, it is important to prevent any applications from writing to either chunk_1 or chunk_2. Thus, the logical chunk addresses for logical chunk_1 and logical chunk_2 are each locked for writes/updates. (block 525) Because the two direct chunks are to be mapped to a previously unused chunk in the shared region 38A, an unused chunk needs to be located in the shared region 38A (block 520). A comparison is made to confirm that the direct chunk_1 and the duplicate direct chunk_2 are still the same (block 530). This step can also be used to verify that the underlying data is the same, if there is a concern that the hash is not strong enough.

If the comparison is attempted at block 530 and the comparison fails, then the method 500 will return to the deduplication method 300 of FIGS. 6A-6B an indication/notification that the remap was unsuccessful (block 535). If the comparison at block 530 was successful, then one of the two duplicate chunks is copied to the unused chunk in the shared region 38A that was previously located (block 540). The shared map 82A is updated so that the logical addresses of chunk_1 and chunk_2 now point to the previously unused shared chunk that was located at block 520 (block 545). Next, the shared bit maps 80A for the direct physical chunk addresses of chunk_1 and chunk_2 are each set to 1 (block 550). Chunk_1 and chunk_2 are now both unneeded chunks.

Assuming that the storage associated with chunk_1 and chunk_2 is to be freed at this point (and not at some other time, e.g., the other times shown in FIG. 5), the direct chunk_1 and the direct chunk_2 are each deallocated (block 555). For example, in one embodiment, at block 555, the allocation process for the thin provisioning layer 54 can be directed to return the storage used by the chunks at PCA_1 and PCA_2 to the pool 60. As those of skill in the art will appreciate, other methods for deallocation and allocation also are usable with the read method of FIG. 8, as discussed previously in connection with FIG. 7. The logical addresses of both chunk_1 and chunk_2 are then unlocked for writes (block 560), and notification of a successful remap is returned to FIGS. 6A-6B (block 565). As with the method of FIG. 7, in the method of FIG. 8, the updating of the shared map 82A can occur in bulk. For example, in a further embodiment, all the data could be copied (when necessary) to the shared region 38A first, the mapping metadata in the shared map 82A could then be updated, then the shared bits 80A could all be set, and finally all the duplicate space freed, but this is an optimization and is not required.

Referring briefly again to FIG. 5, recall that the space-reclamation processes (such as the deduplication just discussed in connection with FIGS. 6-8) can run in parallel with, or in connection with, I/O processes such as reads and writes. FIG. 9 is a flow chart illustrating a method for writing data, in accordance with one embodiment of the invention, and FIG. 10 is a flow chart of a method for reading data, in accordance with one embodiment of the invention. FIGS. 9 and 10 provide advantageous methods for performing reads and writes on logical devices that have undergone deduplication.

Referring now to FIGS. 1A, 2, 3A, 4A, and 9, the method for writing data 1000 assumes that an application 20 can perform a write (in cooperation with the I/O filter driver 72) without having to know whether the data being written is going to be or has been deduplicated or compressed. When a request is received in the system 10A to write data (block 1010), a check is made as to whether the address to be written to is locked (recall that the deduplication processes lock chunks for write at certain points) (block 1012). If the location is locked, the I/O request must wait until the location is unlocked (block 1014). If the location is not locked, data is written through to the LCA location given in the write, which corresponds to a location within the direct chunks 36A (i.e., first N chunks, as with any other write operation) (block 1015).

A check is made as to whether the shared bit 80A is set in the metadata 40A for the LCA of the write (block 1020). If the shared bit is not set (i.e., shared bit 80A for the corresponding logical chunk has a value of "off" or zero), then the chunk being written to is not a shared chunk, so the write overhead is zero (block 1025). If, for the location of the logical chunk being written to, the shared bit 80A of the metadata 40A has a value of 1, then the shared bit is cleared (set to zero) (block 1035), because the write was made to the direct region and future reads to this location need to be informed that the data that was written is in the direct region 36A, and not the shared region 38A. Note that, if the shared bit 80A was set, then any associated shared mapping entry 82A is invalid, but still exists. Invalid entries are cleaned up during garbage collection described further herein in connection with FIGS. 11A, 11B and 11C. Further, since the shared bit is now 0, this shared mapping entry will never be used.

However, for at least one embodiment of the invention, the write method of FIG. 9 is not concerned if the shared bit 80A is cleared at block 1035, but there is still a mapping entry 82A to a shared location—this invalid mapping entry is cleared as part of the garbage collection process described herein in FIGS. 11A-11C. If the garbage collection process of FIGS. 11A-11C is not implemented, as is the case in some embodiments, there would not be as efficient space reclamation, but it wouldn't affect the efficiency of write operations. Further, if the write operation were to include steps to clean up the mapping entry and to clean up a no longer needed shared chunk, doing so might decrease the efficiency of the write operation. In some embodiments, however, the computer system 10A and/or storage appliance 14 used may include devices such as NVRAM/FLASH devices, which are sufficiently fast as compared to, e.g., conventional disk drives, such that the overall process will still be highly efficient.

Referring again to FIG. 9, the portion of the bitmap that holds the shared bit 80A is written to storage (block 1040). If several writes are occurring in parallel, one store of the bitmap portion in block 1040 can suffice for several writes. Once all the writes to the same region are complete, however, a check is made (block 1060) to confirm that the shared bit 80A is stored safely before the write is safely returned to the application. If the answer at block 1050 is No, the write will fail (block 1055) and an error is returned. If the answer at block 1050 is Yes, then, once the bitmap has been written to disk, the write is essentially complete. The Garbage collection process of FIGS. 11A-11C (described further herein) takes care of any associated leftover (invalid) mapping entries from the write process (block 1057).

Reading data is now described in connection with FIG. 10. Referring now to FIGS. 1A, 2, 3A, 4A, and 10, when an I/O request is received for reading data from a location on vLUN 30 (block 910), the metadata 40A associated with the LCA to be read from is checked (block 915) to determine whether the shared bit 80A currently has a value of 1 in metadata (block 920). Note that, in accordance with at least one embodiment of the invention, at least the shared bit 80A portion of the metadata 40A advantageously is always in a fast media, such as memory 15, so that checking the shared bit 80A consumes no extra overhead. If the shared bit 80A does not currently have a value of 1, then the read request can go through to the storage location in the direct region 36A in a manner similar to a conventional read, resulting in zero overhead (block 925).

If the shared bit 80A currently has a value of 1 in the metadata 40A (indicating that the chunk is a shared chunk), then a check is made to see whether the shared mapping entry 82A of the metadata 40A for this logical chunk address also already is in memory (block 930). Previous I/O actions can cause the shared mapping 82A of the metadata 40A for this logical chunk address to be already in memory. If the shared mapping metadata 82A for this logical chunk address is already in memory, then the read overhead is zero (block 940), because no extra reads are required to get to the metadata. If the shared mapping metadata 82A for this logical chunk address is not already in memory, then the read overhead is equal to the number of reads needed to get the shared mapping metadata entry 82A for this logical chunk address, which, in one example, is one extra read (therefore a read overhead of one (1)) (block 935). To get the actual data for the read, the shared map entry 82A for this logical chunk address in the metadata 40 is checked to find the physical chunk address of the actual location in the shared region 38A where the data is stored (block 945), and the data read from the shared location is returned (block 950).

FIGS. 11A-11B provide a flow chart of a method 600 for garbage collection, in accordance with one embodiment the invention. Garbage collection is a process to clean up leftover information and/or leftover states from successful or unsuccessful writes. In one embodiment, as is illustrated in FIG. 2, garbage collection 70 is a process running in user space 56. Garbage collection is used where the state in the computer system 10A is valid, but the mapping entries indicate an inconsistency. For example, in one embodiment, garbage collection helps to correct mapping issues that arise from situations where the shared bit 80A for a particular logical chunk address has a value of 0, but the shared resource still exists (i.e., the metadata 40A still includes a shared map entry 82A pointing to a location in the shared region 38A). In this situation, the garbage collection process removes the entry from the shared map 82A, and, if this shared chunk is no longer in use (i.e., is an unneeded chunk), the chunk in the shared region 38A is released (e.g., the thin provisioning layer 54 is instructed to deallocate the shared physical chunk address). In another example, garbage collection can be used when the shared bit 80A for a particular logical chunk address has a value of 1, but there is still allocated storage in the direct region for that logical chunk address. In this situation, the garbage collection process can release the chunk in the direct region 36A, to free up this unneeded storage.

Advantageously, garbage collection runs out of band to I/O processes and also does not run at the same time as space reclamation processes such as deduplication or compression. Although FIG. 5 illustrates garbage collection as running before deduplication, this is not limiting. Garbage collection can, for example, run before or after any one or more of deduplication, compression, or other system processes. One reason for running garbage collection by itself is that the garbage collection process can consume significant system resources. In addition, as noted previously, running garbage collection prior to deduplication has the potential to maximize the space reclamation. As those of skill in the art will appreciate, there should be synchronization between garbage collection and any application reads and writes that occur.

Referring now to FIGS. 1A, 2, 3A, 4A, and the garbage collection method 600 of FIGS. 11A-11C, if deduplication (FIG. 6) or other processes (e.g., reads, writes, compression, I/O, etc.) are running (block 610), then the garbage collection method 600 waits (block 615) until it is complete. Assuming deduplication is not running, in one embodiment, garbage connection is implemented in part by providing a data structure GC, that is indexed by shared physical chunk address (sPCA) that, for each allocated chunk in the shared region 38A, keeps: the state of that allocated chunk (i.e., one of no valid mapping; one valid mapping; many valid mappings); and, if applicable (i.e., if the state is one valid mapping), the logical chunk address (LCA) associated with that one valid mapping (block 617). This data structure could be set up, for example, as a hash table or an array, as will be appreciated by those of skill in the art. This data structure has an entry for each chunk in the shared region 38A.

The garbage collection process goes through each LCA in the vLUN 30 (e.g., going from 0 to N−1) and checks its mapping (block 625). For example, the metadata 40A can be checked to see if there is a shared mapping entry 82A for the LCA. If the shared mapping entry does not exist for that LCA (block 630), then the processing jumps to the next LCA (block 687). If no more LCA's are to be examined, processing goes to block 710. Thus, in the garbage collection process of FIGS. 11A-11C, checks are made in the shared region 38A to see if any blocks that were indicated as shared are, because of writes, no longer shared (i.e. > only one reference to the shared chunk). For chunks in the shared region 38A that are no longer shared, it can be advantageous to move the no-longer-shared block into the direct region 36A, because direct access is faster, but the steps to move the chunk from shared to direct are, as indicated in FIGS. 11A-11C, optional, especially the group of steps labeled as group 750, which are optional as a group.

If, at block 630, there is a mapping for that LCA, then the process looks up GC[SharedMap[LCA].sPCA], so that a check is made in the data structure GC to see if there is an entry for the shared physical chunk address (sPCA) (block 640) (that is, the entry is located in the GC data structure for the sPCA pointed to by the mapping entry for that LCA) (block 640). If the answer at block 640 is "No", then a new entry is created in the GC data structure having an initial state of "No Valid Mapping" (block 645), and processing continues to block 650.

If the answer at block 640 is "Yes", then at block 650 a check is made to see if the SharedBitMap[LCA] currently has a value of 1 (i.e., whether the shared bit 80A has a value of 1 for that logical chunk address (block 650)). If the shared bit 80A does not have a value of 1 (i.e., is clear, and has a value of zero (0)), then there should not be any shared resource, because no sharing is occurring. Thus, if the shared bit 80A has a value of zero, but there's an entry in the mapping that points to the sPCA (i.e., if the answer at block 650 is No), the mapping entry (the shared map entry 82A) is deleted for this LCA (i.e., the shared map entry is removed or set to a null sPCA value) (block 655) to correct the inconsistency. This inconsistency could have occurred, for example, if a write occurred to direct region (FIG. 9), but leftover mapping data remained. Processing continues from block 655 to block 687 (described further below), which is a check to see if all LCA's have been examined. If they have all been examined, processing will proceed to block 710. If they have not all been examined, processing goes on to the next LCA (block 625).

Referring back to block 650, if the shared bit has a value of 1 (i.e., the answer at block 650 is Yes), a check is made at block 660 to see if the state in the GC entry for this sPCA has a value of "no valid mapping," (block 660), by checking whether the GC entry for this sPCA has a state equal to "no valid mapping". If the answer at block 660 is Yes, then the GC state is set to "one valid mapping", and the LCA is stored in the GC entry (block 645) (i.e., is added to the data structure GC (block 665). From block 665, processing goes to block 680 which is a check to see if the dPCA (which is the chunk at the dPCA that has the same value as the LCA) is allocated. Note that the check at block 680 is done for all cases of the state (i.e., no valid mapping, one valid mapping, and many valid mappings) of the GC entry for the sPCA in the method of FIGS. 11A-11C. If the dPCA is allocated, processing proceeds to block 685, described further below. If the dPCA is not allocated, processing proceeds to block 687, described above and also further below.

Note also that, in the method of FIGS. 11A-11C, the method is iterating through the LCAs, where up to this point (block 665) what has been found is only a single valid mapping to a particular sPCA. In one embodiment, it is necessary to know what the mapping is, so that the chunk can be moved back to the direct region 36A, if no other valid mappings to this sPCA are found during the entire iteration. That is, this part of the garbage collection process (FIG. 11A) is creating a reverse mapping from sPCA to LCA (if there is only one) and a count of how many logical chunks are shared for each shared physical chunk. In this embodiment, the garbage collection process does not care about all values of this count; all the garbage collection process cares about are 0, 1, and many. In another embodiment, the deduplication process 44 (during deduplication) and the deduplication block layer 28 (during writes) keep this reference count in the shared map 82 A and optionally also keep the reverse mapping from PCA to LCA (in the shared map 82 A), although keeping the reference count in this alternative way is not always as efficient as generating the values of 0, 1, and many during garbage collection, as is done in the embodiment shown in FIGS. 11A-11C Referring again to FIGS. 11A-11C, if, at block 660 the answer was "No" (i.e., the current state is not "no valid mapping"), while at the same time there is an entry in the shared map that points to the sPCA, and the shared bit 80 has a value of 1, a check is made at block 670 to see if the GC entry for this sPCA has a state of "one valid mapping". If the answer at block 670 is "Yes,", then in block 675 the GC state is set to "many valid mappings" and the shared LCA is removed from the GC entry, because if there is more than one valid mapping to this sPCA, it won't be able to be moved back to the direct region 36A (block 675), and processing moves to block 680, where processing proceeds as described previously.

Referring again to FIGS. 11A-11C, if at block 670 the answer was "No" (i.e., the current state is not "one valid mapping"), while at the same time there is an entry in the shared map that points to the sPCA, and the shared bit 80 has a value of 1, then processing moves to block 680, where (as described previously for other states), a check is made to see if the direct physical chunk address (dPCA), which has the same value as this logical chunk address (LCA), is allocated (block 680). If the dPCA is allocated, and there is a shared mapping for the LCA, then the dPCA (which is the same address as the LCA) is not being used, so it can be released. Thus, if the answer at block 680 is Yes, then the thin provisioning layer 54 (FIG. 1A) is instructed to deallocate the storage at this dPCA, a process that inherently includes synchronization (block 685). During the deallocation (block 685), the following steps (not shown in FIGS. 11A-11C) also take place: the LCA associated with the dPCA is locked for writes (i.e., no writes during the deallocation process); a check is made to verify that the shared bit 80A for the LCA has a value of 1; the dPCA is deallocated (i.e., the direct physical chunk is freed); and the LCA is unlocked for writes.

After the steps of block 685 are completed, processing then jumps from block 685 to block 687, to move on to the next LCA, if applicable.

Referring again to FIG. 11A, if, at block 680, the answer is No (i.e., the dPCA is not allocated), then no garbage collection is required for the direct chunk that corresponds with this particular LCA. The process flows to block 687, to check if all LCA' have been examined. The garbage collection process continues from here through iteration of the LCA's, returning back to block 625, until all LCA's have been examined (block 687). When all LCA's have been examined (i.e., the answer at block 687 is Yes), processing moves to block 700 of FIG. 11B (block 690), which begins the process of iteration through the GC data structure (see FIG. 11B). In particular, the garbage collection processing of FIG. 11B looks at the results stored in the GC data structure after the iteration through all LCA's of FIG. 11A is complete.

Referring now to FIGS. 11A-11C, the garbage collection process then checks each entry in the aforementioned data structure GC, by iterating through each GC entry, indexed by sPCA (block 710). For each entry, a check is made to see if the state is set to "no valid mapping" (block 715). If the state is "no valid mapping" (i.e., the answer at block 715 is Yes), then the shared PCA can be deallocated (block 720), by instructing the thin provisioning layer 54 to deallocate the sPCA. Processing moves from block 720 to block 742, which is a check to see if all sPCAs have been examined. If the answer at block 715 is No (i.e., the GC entry has a state that is something other than "no valid mapping"), then a check is made to see if the GC entry has a state equal to "one valid mapping" (block 725). If the state is "one valid mapping" (i.e., the answer at block 725 is Yes), then the chunk at the sPCA can be copied to the direct region address dPCA set to the LCA stored in the GC record (block 730), and advantageously this is done in manner that avoids synchronization issues, as will be appreciated by those of skill in the art. Once the copy is complete, the shared bit 80A is cleared for the LCA stored in the GC (to indicate that this LCA is no longer shared) (block 735). The thin provisioning layer 54 is instructed to deallocate the chunk located at sPCA (block 737), and the shared mapping entry for the LCA stored in the GC is deleted from the metadata (block 740). This process from block 710 through block 740 can continue and iterate until all sPCA's have been examined (block 742), and garbage collection ends (block 745).

If at block 725, the state is not "no valid mapping" or "one valid mapping" (i.e., the answer at block 725 is No), then it must be "many valid mappings" and the sPCA is indeed shared and cannot be freed or moved to the direct region 36A. Processing then proceeds from a "No" at block 725 to block 742, which checks whether all sPCAs have been examined. If the answer at block 742 is No, then processing returns to block 710, to continue iterating through each GC entry, indexed by sPCA. If the answer at block 742 is Yes, then all sPCAs have been examined, and the garbage collection process ends at this point (block 745).

The systems, layouts, mappings, and methods disclosed herein are especially useful in computer systems utilizing an enterprise storage system, however, one of ordinary skill in the art will appreciate that the features and principles of the present invention may be implemented in many other types of computer systems. One of ordinary skill in the art will also appreciate that features and principles of the present invention may be implemented in different components of a computer system with at least one associated data storage subsystem.

In describing the embodiments of the invention illustrated in the figures, specific terminology is used for the sake of clarity. However, the invention is not limited to the specific terms so selected, and each specific term at least includes all technical and functional equivalents that operate in a similar manner to accomplish a similar purpose.

As those skilled in the art will recognize, the invention described herein can be modified to accommodate and/or comply with existing and/or newly developed technologies and standards. In addition, variations, modifications, and other implementations of what is described herein can occur to those of ordinary skill in the art without departing from the spirit and the scope of the invention as claimed. Further, virtually any aspect of the embodiments of the invention described herein can be implemented using software, hardware, or in a combination of hardware and software.

It should be understood that, in the Figures of this application, in some instances, a plurality of system elements or method steps may be shown as illustrative of a particular system element, and a single system's element or method step may be shown as illustrative of a plurality of a particular systems elements or method steps. It should be understood that showing a plurality of a particular element or step is not intended to imply that a system or method implemented in accordance with the invention must comprise more than one of that element or step, nor is it intended by illustrating a single element or step that the invention is limited to embodiments having only a single one of that respective elements or step. In addition, the total number of elements or steps shown for a particular system element or method is not intended to be limiting; those skilled in the art will recognize that the number of a particular system element or method steps can, in some instances, be selected to accommodate the particular user needs. Moreover, the steps of the disclosed methods may be modified in any manner, including by reordering steps and/or inserting or deleting steps, without departing from the principles of the invention.

The processes, flow charts, and flow diagrams provided herein do not depict the syntax of any particular programming language. Rather, they illustrate the functional information one of ordinary skill in the art requires to fabricate circuits or to generate software. The modules, programs, service, engines, and other components referred to herein at least refer to software routines or objects that can execute on the computer system or host and can be implemented in many different ways, including but not limited to processes, threads, or objects that execute on the computing system. It should be noted that many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit and scope of the invention.

It is believed that computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C, C++, HTML, XML, or HTML with included Java applets. In addition, one or more of such software sections or modules can be integrated into a computer system or browser software.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed.

The invention claimed is:

1. An apparatus for reclaiming storage space identified as no longer in use, the apparatus comprising:
   a virtual logic unit (vLUN) layer constructed and arranged to be part of the input/output (I/O) path of a computer system, the vLUN configured to provide a plurality of logical chunk addresses (LCAs) to layers disposed above it;
   a thinly provisioned mapped logical unit (mapped LUN) layer disposed below and in operable communication with the vLUN layer, the thinly provisioned mapped LUN being in operable communication with a pool of storage units that provide, as requested, storage space to the thinly provisioned mapped LUN, wherein the mapped LUN is associated with a plurality of physical chunk addresses (PCAs), each PCA configured to provide physical storage for a respective chunk of data; and
   a data reduction engine in operable communication with the vLUN, the data reduction engine configured to:
      perform a data reduction process on a first logical chunk of data stored in the vLUN at a first LCA and associated with a first PCA;
      remap the first LCA to a second PCA in a second region of the mapped LUN such that a first PCA in a first region of the mapped LUN is no longer required for storage of a first logical chunk of data and is therefore a first unneeded chunk, wherein: the first region on the mapped LUN comprises a set of first PCAs, each first PCA being allotted to provide physical storage for a respective first chunk of data stored at a single first corresponding LCA in the vLUN; and wherein the second region of the mapped LUN comprises a set of second PCAs, each second PCA being allotted to provide physical storage for a respective second chunk of data, where the second chunk of data corresponds to data that is associated with at least two LCAs; and
      instruct the thinly provisioned mapped LUN to deallocate the first PCA associated with the first unneeded chunk.

2. The apparatus of claim 1, further comprising a mapping layer, the mapping layer comprising a first portion indicating, for each LCA in the vLUN, whether the corresponding PCA for the LCA is in the first region or the second region of the mapped LUN, and a second portion providing, if the corresponding PCA is in the second region of the mapped LUN, mapping information for the LCA to the corresponding PCA in the second region.

3. The apparatus of claim 2, wherein the first portion is stored in at least one of memory of the computer system or in a fast media accessible to the computer system, to help improve the efficiency of I/O access to the chunks of data stored in the mapped LUN.

4. The apparatus of claim 1, wherein the mapped LUN has a minimum size of storage that it can be directed to allocate or deallocate from the pool of storage units, and wherein the first logical chunk of data has a size that is a nonzero integer multiple of the first minimum size.

5. The apparatus of claim 1, wherein the mapped LUN has a minimum size of storage that it can be directed to allocate or deallocate from the pool of storage units and wherein the first logical chunk of data has a size that is greater than or equal to the first minimum size.

6. The apparatus of claim 1, wherein the data reduction engine comprises at least one of a deduplication engine and a compression engine.

7. The apparatus of claim 6, wherein the mapped LUN has a minimum size of storage that it can be directed to allocate or deallocate from the pool or storage units, and wherein the at least one of the deduplication engine and the compression engine is operable on a data reduction chunk of data having a size that is a nonzero integer multiple of the minimum size.

8. The apparatus of claim 1, wherein the mapped LUN is implemented as part of the pool of storage units.

9. The apparatus of claim 1, wherein the mapped LUN is implemented as part of a computer system.

10. An apparatus usable with a computer system to reclaim storage space identified as no longer in use, the apparatus comprising:
- a virtual logic unit (vLUN) layer constructed and arranged to be part of the input/output (I/O) path of the computer system, the vLUN configured to provide a plurality of logical chunk addresses (LCAs) to layers disposed above it;
- a thinly provisioned mapped logical unit (mapped LUN) layer disposed below and in operable communication with the vLUN layer, the thinly provisioned mapped LUN being in operable communication with a pool of storage units that provide, as requested, storage space to the thinly provisioned mapped LUN, wherein the mapped LUN is associated with a plurality of physical chunk addresses (PCAs), each PCA configured to provide physical storage for a respective chunk of data;
- a mapping layer disposed between and in operable communication with the vLUN and the mapped LUN, the mapping layer configured to:
  - define first and second regions on the mapped LUN, the first region comprising a set of first PCAs, each first PCA being allotted to provide physical storage for a respective first chunk of data stored at a single first corresponding LCA in the vLUN, the second region comprising a set of second PCAs, each second PCA being allotted to provide physical storage for a respective second chunk of data, where the second chunk of data corresponds to data that is associated with at least two LCAs;
  - indicate, for each LCA in the vLUN, whether the corresponding PCA for the LCA is in the first region or the second region of the mapped LUN; and
  - provide, if the corresponding PCA is in the second region of the mapped LUN, mapping information for the LCA to the corresponding PCA in the second region; and
- a data reduction engine in operable communication with the vLUN, the data reduction engine configured to:
  - perform a data reduction process on a first logical chunk of data stored in the vLUN at a first LCA and associated with a first PCA;
  - remap the first LCA to a second PCA in the second region, such that the first PCA in the first region is no longer required for storage of the first logical chunk of data and is therefore a first unneeded chunk; and
  - instruct the thinly provisioned mapped LUN to deallocate the first PCA associated with the first unneeded chunk.

11. The apparatus of claim 10, wherein the mapped LUN has a first minimum size of storage that it can be directed to allocate or deallocate, and wherein the first logical chunk of data is a nonzero integer multiple of the first minimum size.

12. The apparatus of claim 10, wherein the data reduction engine further comprises at least one of a deduplication engine and a compression engine.

13. The apparatus of claim 10, wherein the first portion is stored in at least one of memory of the computer system or in a fast media accessible to the computer system, to help improve the efficiency of I/O access to the chunks of data stored in the mapped LUN.

14. A method for reclaiming storage space identified as no longer in use, the method comprising:
- configuring a virtual logic unit (vLUN) layer to provide a plurality of logical chunk addresses (LCAs) to layers disposed above it, wherein the vLUN constructed and arranged to be one of a plurality of layers comprising the input/output (I/O) path of a computer system;
- disposing a thinly provisioned mapped logical unit (mapped LUN) layer below and in operable communication with the vLUN layer, the thinly provisioned mapped LUN being in operable communication with a pool of storage units that provide, as requested, storage space to the thinly provisioned mapped LUN, wherein the mapped LUN is associated with a plurality of physical chunk addresses (PCAs), each PCA configured to provide physical storage for a respective chunk of data; and
- configuring a data reduction engine to be in operable communication with the vLUN, wherein the data reduction engine is constructed and arranged to:
  - perform a data reduction process on a first logical chunk of data stored in the vLUN at a first LCA and associated with a first PCA;
  - remap the first LCA to a second PCA in a second region of the mapped LUN such that a first PCA in a first region of the mapped LUN is no longer required for storage of a first logical chunk of data and is therefore a first unneeded chunk, wherein: the first region of the mapped LUN comprises a set of first PCAs, each first PCA being allotted to provide physical storage for a respective first chunk of data stored at a single first corresponding LCA in the vLUN; and wherein the second region of the mapped LUN comprises a set of second PCAs, each second PCA being allotted to provide physical storage for a respective second chunk of data, where the second chunk of data corresponds to data that is associated with at least two LCAs; and
  - instruct the thinly provisioned mapped LUN to deallocate the first PCA associated with the first unneeded chunk.

15. The method of claim 14, further comprising providing a mapping layer, the mapping layer comprising a first portion indicating, for each LCA in the vLUN, whether the corresponding PCA for the LCA is in the first region or the second region of the mapped LUN, and a second portion providing, if the corresponding PCA is in the second region of the mapped LUN, mapping information for the LCA to the corresponding PCA in the second region.

16. The method of claim 15, wherein the first portion is stored in at least one of memory of the computer system or in a fast media accessible to the computer system, to help improve the efficiency of I/O access to the chunks of data stored in the mapped LUN.

17. The method of claim 14, further comprising storing in the memory of the computer system or in fast media accessible to the computer system, information indicating, for each LCA in the vLUN, whether the corresponding PCA for the LCA is in the first region or the second region of the mapped LUN.

18. The method of claim 14, further comprising disposing the mapped LUN so that it is part of the pool of storage units.

19. The method of claim 14, further comprising disposing the mapped LUN so that it is part of a computer system.

20. The method of claim 14, wherein the data reduction process comprises at least one of a deduplication process and a compression process.

* * * * *